(12) United States Patent
Kawase

(10) Patent No.: US 12,706,558 B2
(45) Date of Patent: Aug. 11, 2026

(54) TRANSFER SYSTEM

(71) Applicant: Mitsubishi Electric Corporation, Tokyo (JP)

(72) Inventor: Tatsuya Kawase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/130,180

(22) PCT Filed: Mar. 1, 2023

(86) PCT No.: PCT/JP2023/007643

§ 371 (c)(1),
(2) Date: May 15, 2025

(87) PCT Pub. No.: WO2024/180738

PCT Pub. Date: Sep. 6, 2024

(65) Prior Publication Data

US 2026/0012120 A1 Jan. 8, 2026

(51) Int. Cl.
*H02P 29/68* (2016.01)
*B65G 54/02* (2006.01)
(Continued)

(52) U.S. Cl.
CPC .............. *H02P 29/68* (2016.02); *B65G 54/02* (2013.01); *H02K 41/031* (2013.01); *H02P 25/064* (2016.02)

(58) Field of Classification Search
CPC ....... H02P 29/68; H02P 25/064; B65G 54/02; H02K 41/031
(Continued)

(56) References Cited

U.S. PATENT DOCUMENTS 6,956,345 B2 10/2005 Iribe et al.
6,956,346 B2 10/2005 Iribe et al.
(Continued)

FOREIGN PATENT DOCUMENTS

DE 102020007535 A1 * 6/2021 .......... H02P 29/0241
JP S61-173607 A 8/1986
(Continued)

OTHER PUBLICATIONS

Office Action issued Sep. 9, 2025 in Korean Patent Application No. 10-2025-7020911, 15 pages.
(Continued)

*Primary Examiner* — James R Bidwell
(74) *Attorney, Agent, or Firm* — XSENSUS LLP

(57) ABSTRACT

A transfer system includes a plurality of transfer path units forming a transfer path on which one or a plurality of transferring bodies moves. Each of the plurality of the transfer path units includes a plurality of drive units that is energized to generate thrust for moving the transferring body, and a processor that determines whether or not each of the plurality of the drive units is in an overload state and also determines whether or not the transfer path unit is in the overload state. In each of the plurality of the transfer path units, the processor executes overload protection processing that lowers the temperature of the drive unit determined to be in the overload state or the temperature of the transfer path unit determined to be in the overload state.

18 Claims, 13 Drawing Sheets

(51) Int. Cl.
*H02K 41/03* (2006.01)
*H02P 25/064* (2016.01)

(58) Field of Classification Search
USPC .......................................................... 198/805
See application file for complete search history.

(56) References Cited

U.S. PATENT DOCUMENTS

| | | | | |
|---|---|---|---|---|
| 6,965,210 | B2 | 11/2005 | Iribe et al. | |
| 6,979,969 | B2 | 12/2005 | Iribe et al. | |
| 6,987,374 | B2 | 1/2006 | Iribe et al. | |
| 6,989,645 | B2 | 1/2006 | Iribe et al. | |
| 6,995,535 | B2 | 2/2006 | Iribe et al. | |
| 6,998,809 | B2 | 2/2006 | Iribe et al. | |
| 11,831,182 | B1 * | 11/2023 | Huang | H02J 50/10 |
| 11,858,140 | B2 | 1/2024 | Hasunuma et al. | |
| 2002/0195889 | A1 | 12/2002 | Takedomi et al. | |
| 2013/0135603 | A1 * | 5/2013 | Binnard | H02K 41/03 355/72 |
| 2014/0097783 | A1 | 4/2014 | Hara | |
| 2015/0035458 | A1 * | 2/2015 | Takase | H02P 25/06 318/135 |
| 2015/0344233 | A1 * | 12/2015 | Kleinikkink | G05B 19/4185 700/230 |
| 2017/0054400 | A1 | 2/2017 | Kumazawa et al. | |
| 2021/0067007 | A1 * | 3/2021 | Okazaki | H02K 9/22 |
| 2021/0197369 | A1 | 7/2021 | Hasunuma et al. | |
| 2024/0059327 | A1 * | 2/2024 | Huang | B61B 13/00 |
| 2024/0178785 | A1 * | 5/2024 | Goldman | G01K 15/005 |

FOREIGN PATENT DOCUMENTS

| | | | | |
|---|---|---|---|---|
| JP | H09-074616 | A | 3/1997 | |
| JP | H09-208051 | A | 8/1997 | |
| JP | 2003-037991 | A | 2/2003 | |
| JP | 2004-209630 | A | 7/2004 | |
| JP | 2012-095415 | A | 5/2012 | |
| JP | 2013-212018 | A | 10/2013 | |
| JP | 2014-117026 | A | 6/2014 | |
| JP | 2016-146693 | A | 8/2016 | |
| JP | 2017-042029 | A | 2/2017 | |
| KR | 10-2021-0006431 | A | 1/2021 | |
| WO | WO-2019238416 | A1 * | 12/2019 | H02K 41/031 |

OTHER PUBLICATIONS

International Search Report and Written Opinion mailed on May 23, 2023, received for PCT Application PCT/JP2023/007643, filed on Mar. 1, 2023, 8 pages including English Translation.
Decision to Grant a Patent mailed on Dec. 26, 2023, received for JP Application 2023-558244, 5 pages including English Translation.
Office Action mailed on Nov. 27, 2025 for the corresponding Chinese patent application No. 202380089549.X and an English machine translation thereof, 16pp.

* cited by examiner 1
10
11A
11B
11C
11D
11E
11F
11G
11H
12
CONTROLLER
13
DC POWER SUPPLY
14
15
16A
16B
16C
17A
17B COMMU-
NICATION
SLAVE
STATION
PROCES-
SOR
VOLT-
AGE
DETEC-
TOR
TEM-
PERA-
TURE
SENSOR
N
S
N
S
N
S
N
S
N
S
11
14
14
15
16
20
21
22
23
24
25
26
27
28
31
32
33
34
40
41

L
42
16A
16B
16C
16D
41
40
11
26
25
20
22
21
15
31
32
24
23
N
S
VOLT-
AGE
DETEC-
TOR
PROCES-
SOR
27
COMMU-
NICATION
SLAVE
STATION
28
TEM-
PERA-
TURE
SENSOR
33
34
14
14

FIG.6

TIME[s]

CURRENT[A]

$I_{cratedmax}$ t1 t2 t3 t4 t5 t6 t7

2L
16A
16B
N
S
COMMU-
NICATION
SLAVE
STATION
PROCES-
SOR
VOLT-
AGE
DETEC-
TOR
TEM-
PERA-
TURE
SENSOR
11
14
15
20
21
22
23
24
25
26
27
28
31
32
33
34
40
41
42

FIG.9

TIME[s]

CURRENT[A]

$I_{cratedmax}$ $I_{crated1}$ t11 t12

TRANSFER SYSTEM

CROSS-REFERENCE TO RELATED APPLICATION

This application is a national stage application, pursuant to 35 U.S.C. § 371, of International Patent Application No. PCT/JP2023/007643, filed Mar. 1, 2023, the entire contents of which are incorporated herein by reference.

FIELD

The present disclosure relates to a transfer system that transfers an object.

BACKGROUND

A production line in which factory automation is introduced such as a production line for assembling an industrial product or a production line for packaging a food product generally uses a transfer system that transfers a workpiece. In the transfer system that has been used in many situations in recent years, a transfer path for transferring the workpiece is divided into a plurality of zones, and a carrier that carries the workpiece is moved by a controller disposed in each of the zones. Such a transfer system is known as one of the transfer systems that excel in production efficiency.

As one mode of the transfer system, a so-called moving magnet linear motor is used in which a magnet is disposed on the carrier as a mover, and coils are disposed on a stator constituting the transfer path. The moving magnet linear motor is suitable for moving the mover over a stroke longer than the length of the mover. On the transfer path, a plurality of the coils is arranged in a direction in which the mover is moved.

Patent Literature 1 discloses a system that includes a carrier as a transferring body and a plurality of coils arranged on a transfer path, where the carrier is moved by the action of a magnetic field generated by passing a current to the coils.

CITATION LIST

Patent Literature

Patent Literature 1: Japanese Patent Application Laid-open No. S61-173607

SUMMARY OF INVENTION

Problem to be Solved by the Invention

The system as disclosed in Patent Literature 1 implements overload protection for avoiding a problem such as burnout due to overheating in driving a linear motor. In the linear motor, the coils can be a source of heat due to a loss.

In the linear motor that moves the carrier over a stroke longer than the length of the carrier, if the rated current flows only to the coil in the area where the carrier is located among the plurality of the coils arranged on the transfer path, the carrier can be moved without a decrease in the rated thrust. It can be said that the transfer system including such a linear motor rarely operates in an operation pattern in which the rated current constantly flows through all the coils arranged on the transfer path. When such a transfer system is equipped with an overload protection function intended for resolving an overload state in the case where the rated current constantly flows through all of the plurality of the coils, the performance of overload protection exceeds the performance appropriate for the operation of the transfer system. The excessive performance of overload protection makes the configuration for overload protection unnecessarily extensive, which causes an increase in cost of the transfer system. Therefore, it has been desired that the transfer system can implement overload protection appropriate for the operation of the transfer system.

The present disclosure has been made in view of the above, and an object of the present disclosure is to provide a transfer system that can implement overload protection appropriate for the operation of the transfer system.

Means to Solve the Problem

In order to solve the above-described problems and achieve the object, a transfer system according to the present disclosure includes a plurality of transfer path units forming a transfer path on which one or a plurality of transferring bodies moves. Each of the plurality of the transfer path units includes a plurality of drive units that is energized to generate thrust for moving the transferring body, and a processor that determines whether or not each of the plurality of the drive units is in an overload state and also determines whether or not the transfer path unit is in the overload state. In each of the plurality of the transfer path units, the processor executes overload protection processing that lowers the temperature of the drive unit determined to be in the overload state or the temperature of the transfer path unit determined to be in the overload state.

Effects of the Invention

The transfer system according to the present disclosure can implement overload protection appropriate for the operation of the transfer system.

BRIEF DESCRIPTION OF DRAWINGS

FIG. 6 is a second diagram for explaining the worst loss of the transfer path unit in the transfer system according to the first embodiment.

FIG. 9 is a second diagram for explaining the maximum rated loss of the transfer path unit in the transfer system according to the first embodiment.

DESCRIPTION OF EMBODIMENTS

Hereinafter, a transfer system according to embodiments will be described in detail with reference to the drawings.

First Embodiment

Figure 1:
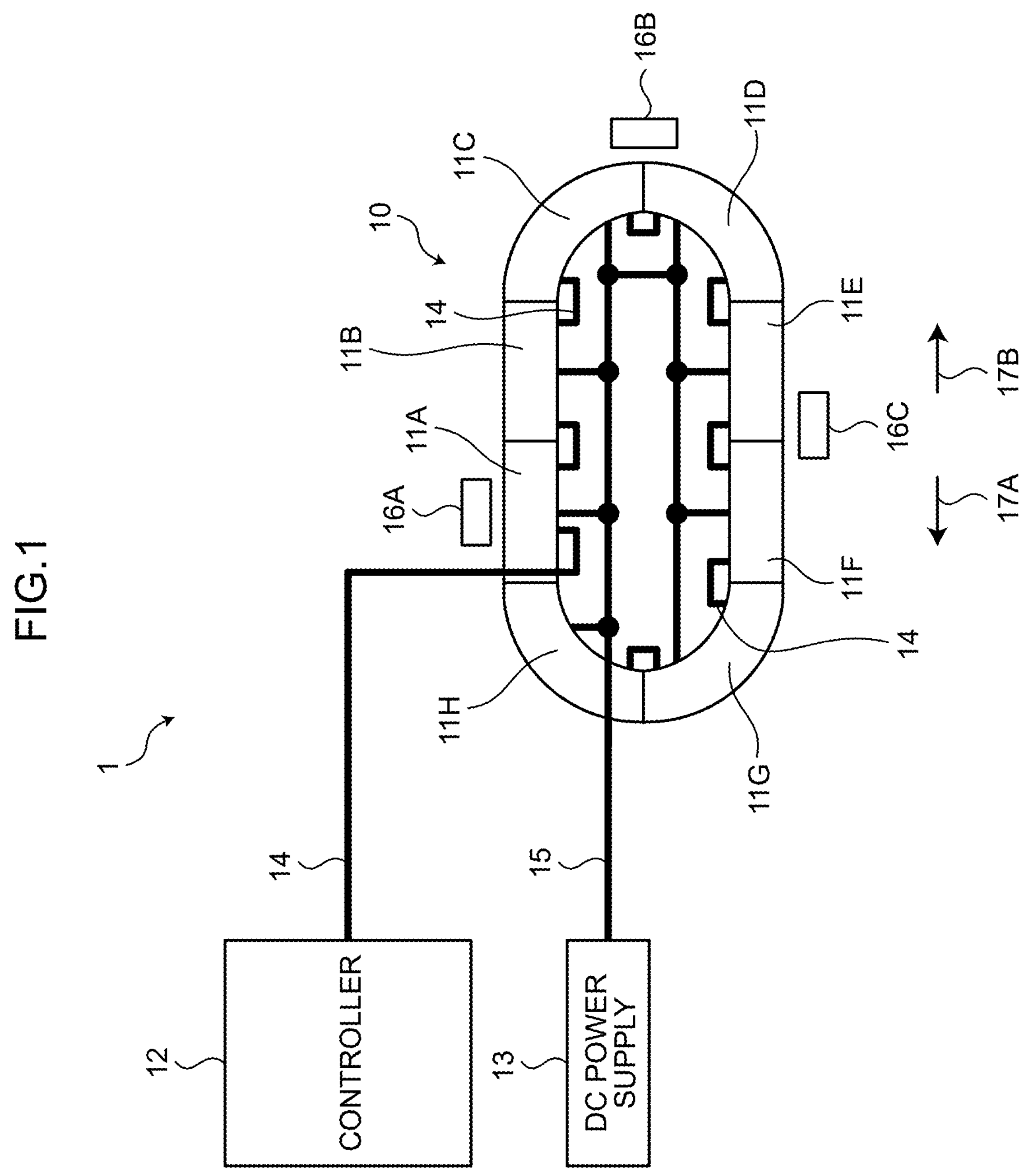
FIG. 1 is a diagram illustrating an exemplary configuration of a transfer system according to a first embodiment.

FIG. 1 is a diagram illustrating an exemplary configuration of a transfer system 1 according to a first embodiment. The transfer system 1 is a system used for transferring an object. In the first embodiment, the transfer system 1 transfers the object by moving a transferring body carrying the object.

The transfer system 1 includes a plurality of transfer path units 11A to 11H, a controller 12, a direct current (DC) power supply 13, and carriers 16A, 16B, and 16C. The controller 12 controls the operation of the carriers 16A, 16B, and 16C via the transfer path units 11A to 11H. In the following description, a transfer path unit 11 refers to each of the transfer path units 11A to 11H not distinguished from each other.

The plurality of the transfer path units 11 is coupled to each other to form a transfer path 10 on which the transferring body moves. The plurality of the transfer path units 11 moves the transferring body by giving power to the transferring body. Each of the carriers 16A, 16B, and 16C is the transferring body. In the following description, a carrier 16 refers to each of the carriers 16A, 16B, and 16C not distinguished from each other.

The transfer path 10 illustrated in FIG. 1 is annular. That is, the transfer path 10 illustrated in FIG. 1 is a closed path. The transfer path 10 of the transfer system 1 may be an open path. That is, the transfer path 10 of the transfer system 1 may be a path with a start point and an end point that are located away from each other.

The transfer path units 11A, 11B, 11E, and 11F are each the transfer path unit 11 that is linear and forms a linear path. The transfer path units 11C, 11D, 11G, and 11H are each the transfer path unit 11 that is curved and forms a curved path, thereby changing a direction of travel of the transferring body. The transfer path 10 may include only the transfer path unit 11 forming the curved path without including the transfer path unit 11 forming the linear path. The transfer path 10 with the start point and the end point that are located away from each other may include only the transfer path unit 11 forming the linear path. An overall shape of the transfer path 10 is determined at will.

The carrier 16 is attached to a side surface of the transfer path 10. The carrier 16 moves along a guide rail provided on the side surface of the transfer path 10. The carrier 16 moves on the side surface of the transfer path 10 and stops on the side surface of the transfer path 10. The transfer system 1 according to the first embodiment is a moving magnet linear motor. The carrier 16 may be one that moves along a guide rail provided on an upper surface of the transfer path 10. The carrier 16 includes permanent magnets constituting a mover, permanent magnets for linear scale, and a guide roller that moves on the guide rail by rotation. FIG. 1 omits the illustration of the guide rail, the guide roller, the permanent magnets constituting the mover, and the permanent magnets for linear scale.

The direction of travel of the carriers 16 is clockwise in FIG. 1 or counterclockwise in FIG. 1. The direction of travel that is clockwise in FIG. 1 is defined as a forward direction. The direction of travel that is counterclockwise in FIG. 1 is defined as a backward direction. An arrow 17A indicates the forward direction. An arrow 17B indicates the backward direction.

In the example illustrated in FIG. 1, the transfer system 1 includes eight of the transfer path units 11 and three of the carriers 16. The number of the transfer path units 11 included in the transfer system 1 is determined at will. That is, the number of the transfer path units 11 forming the transfer path 10 is determined at will. The transfer system 1 need only include a plurality of the transfer path units 11. The number of the carriers 16 moving on the transfer path 10 is determined at will. The transfer system 1 need only include one or a plurality of the carriers 16.

The transfer system 1 is not limited to the system including the linear motor, and may be a system including a rotary motor. The transfer system 1 may be a belt conveyor including the rotary motor and a belt rotated by the rotary motor. The belt conveyor moves a workpiece placed on the belt. The transfer system 1 may be a roller conveyor including a plurality of rollers and the rotary motor that rotates the rollers. The roller conveyor moves a workpiece placed on the rollers.

The DC power supply 13 is connected to the transfer path units 11 via a DC power supply bus 15. The DC power supply 13 is a power supply device or a power supply circuit that outputs a direct current voltage. The DC power supply 13 supplies electric power to the transfer path units 11. The transfer path units 11 share the DC power supply 13.

A positive terminal DC bus and a negative terminal DC bus pass through the DC power supply bus 15. The positive terminal DC bus is referred to as a P bus. The negative terminal DC bus is referred to as an N bus. The P bus is connected to a positive terminal of the DC power supply 13. The N bus is connected to a negative terminal of the DC power supply 13. Hereinafter, a term PN buses is used to refer to both the P bus and the N bus. The plurality of the transfer path units 11 forming the transfer path 10 is connected to the common PN buses.

The transfer system 1 includes a configuration in which the transfer path units 11 are connected to the DC power supply 13 by multi-drop connection. The form of connection between the transfer path units 11 and the DC power supply 13 is not limited to the multi-drop connection, and may be daisy chain connection. In the example illustrated in FIG. 1, the transfer system 1 includes one piece of the DC power supply 13, but may include a plurality of pieces of the DC power supplies 13. That is, the transfer system 1 may include a plurality of power supply domains.

The controller 12 is connected to the transfer path units 11 via a data communication line 14. The data communication line 14 includes a line connecting the controller 12 and the transfer path unit 11A, which is one of the plurality of the transfer path units 11, and lines connecting the transfer path units 11 adjacent to each other. The transfer system 1 includes a configuration in which the transfer path units 11 are connected to the controller 12 by daisy chain connection.

The form of connection between the transfer path units 11 and the controller 12 is not limited to the daisy chain connection. The form of connection between the transfer path units 11 and the controller 12 may be star connection in which the transfer path units 11 are connected to the controller 12 via a communication hub. Alternatively, the transfer system 1 may include a plurality of the data communication lines 14, and the transfer path units 11 and the controller 12 may be directly connected by the data communication lines 14.

The controller 12 generates an operation command indicating a mode of movement for each of the plurality of the carriers 16, and generates a position command for each of the carriers 16 on the basis of the operation command. The operation command includes information such as acceleration, deceleration, and speed of movement. The controller 12 generates a coil drive command on the basis of the position command for each of the carriers 16. The controller 12 outputs the coil drive command to the transfer path units 11. The coil drive command includes a current command indicating a command value of a current that is passed through each coil in the transfer path units 11. The transfer path units 11 each control the current flowing through each coil in accordance with the current command included in the coil drive command. The controller 12 outputs the coil drive command to the transfer path units 11, thereby controlling the movement of the carriers 16.

The controller 12 may be connected to a higher control device, such as a programmable logic controller, that is higher than the controller 12. Such a control device outputs a command for sequence control to the controller 12. A human-machine interface may be connected to the controller 12. An operator operates the human-machine interface to input information to the human-machine interface. The human-machine interface also outputs information indicating a status of the transfer system 1. For example, the human-machine interface displays the information indicating the status of the transfer system 1. The controller 12 may acquire operating information of the carrier 16 from the higher control device or the human-machine interface, and generate the position command on the basis of the operating information. The operating information is information indicating a schedule for the movement of each of the plurality of the carriers 16 on the transfer path 10. The operating information includes information about a movement start position, a stop position, a movement time, and the like.

Next, a configuration of the transfer path unit 11 will be described. Here, the transfer path unit 11 that is linear will be taken as an example to describe the configuration of the transfer path unit 11. The transfer path unit 11 that is curved is different from the transfer path unit 11 that is linear in the mode of arrangement of the coils. Except for the difference in the mode of arrangement of the coils, the configuration of the transfer path unit 11 that is curved is similar to the configuration of the transfer path unit 11 that is linear.

Figure 2:
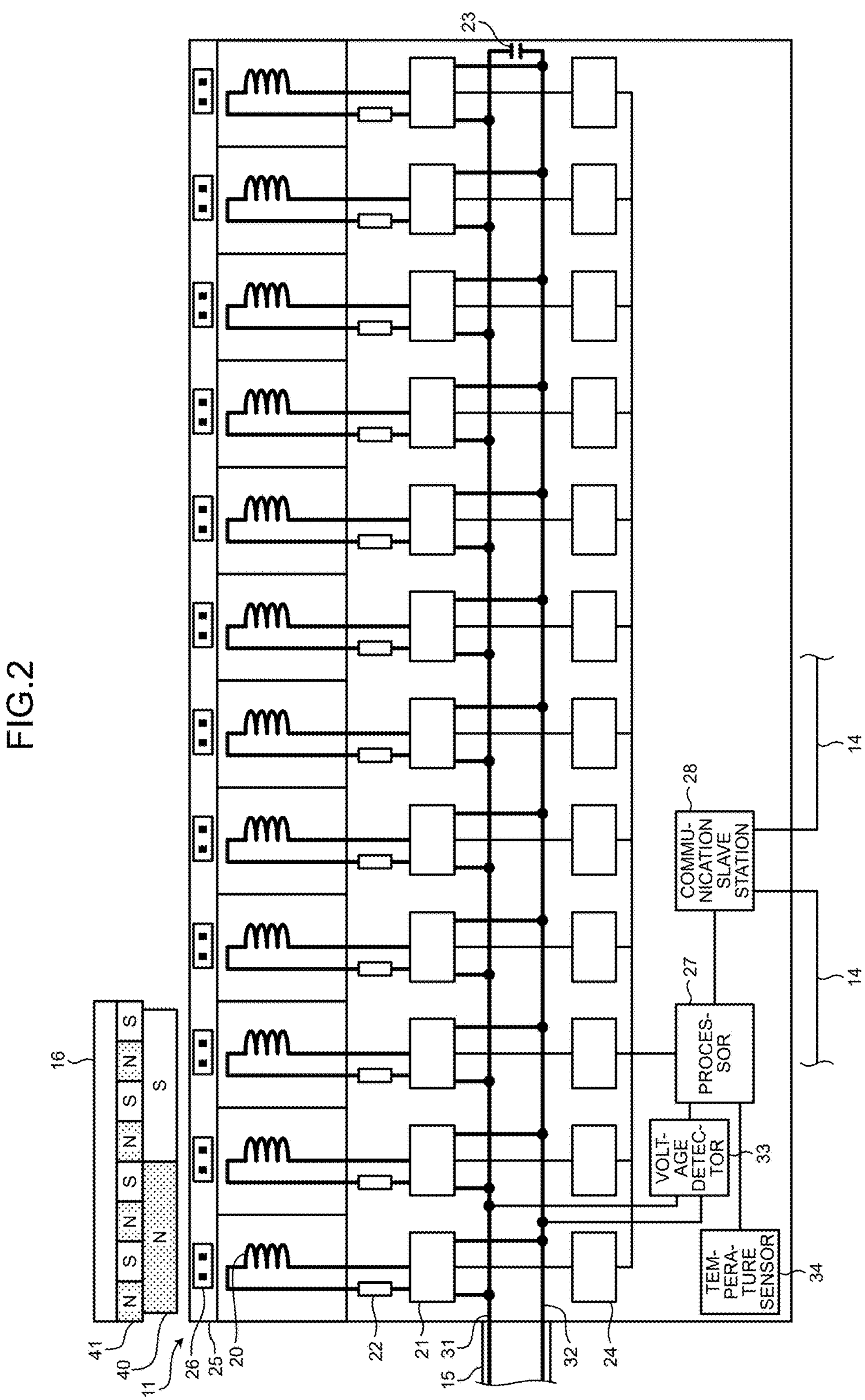
FIG. 2 is a diagram illustrating an exemplary configuration of a transfer path unit included in the transfer system according to the first embodiment.

FIG. 2 is a diagram illustrating an exemplary configuration of the transfer path unit 11 included in the transfer system 1 according to the first embodiment. FIG. 2 illustrates a schematic configuration of the transfer path unit 11 and a schematic configuration of the carrier 16 on the transfer path unit 11. The carrier 16 includes permanent magnets 40 constituting the mover and permanent magnets 41 for linear scale.

FIG. 2 illustrates one N-pole magnet and one S-pole magnet as the permanent magnets 40 constituting the mover, but the permanent magnets 40 constituting the mover can include any number of the N-pole magnets and any number of the S-pole magnets. The N-pole magnet and the S-pole magnet as the permanent magnets 40 are alternately arranged along a direction of arrangement of a plurality of coils 20 to be described later. The carrier 16 moves by obtaining a driving force from an interaction between an electromagnetic force generated by the coils 20, which are to be described later, included in the transfer path unit 11 and a magnetic field generated by the permanent magnets 40 constituting the mover.

Moreover, FIG. 2 illustrates four N-pole magnets and four S-pole magnets as the permanent magnets 41 for linear scale. As illustrated in FIG. 2, the N-pole magnets and the S-pole magnets as the permanent magnets 41 are alternately arranged along the direction of arrangement of the plurality of the coils 20 to be described later. The permanent magnets 41 for linear scale can include any number of the N-pole magnets and any number of the S-pole magnets.

The transfer path unit 11 includes the plurality of the coils 20. In the example illustrated in FIG. 2, the transfer path unit 11 includes 12 pieces of the coils 20. The number of the coils 20 included in the transfer path unit 11 is determined at will. In the transfer path unit 11 that is linear, the plurality of the coils 20 is arranged along a linear path. Note that, in the transfer path unit 11 that is curved, the plurality of the coils 20 is arranged along a curved path. Each of the coils 20 in the transfer path unit 11 includes not only a pure inductance component but also a coil resistance.

Each of the coils 20 in the transfer path unit 11 is connected to an inverter 21. The inverter 21 includes a switching element and supplies power, which is obtained after power conversion by switching of the switching element, to the coil 20. The switching element is not illustrated. The inverter 21 controls a current flowing through the coil 20. The inverter 21 is a single-phase full-bridge inverter circuit or a single-phase half-bridge inverter circuit. The inverter 21 may be a three-phase inverter circuit connected to three of the coils 20.

Each of the inverters 21 in the transfer path unit 11 is connected between a P bus 31 that is a positive terminal wiring of the DC power supply bus 15 and an N bus 32 that is a negative terminal wiring of the DC power supply bus 15. Each of the inverters 21 converts direct current power from the PN buses into alternating current power, and supplies the alternating current power to the coil 20. The inverter 21 uses switching of the switching element to convert the direct current power into the alternating current power.

The coil 20 uses the power supplied from the inverter 21 to generate the electromagnetic force as thrust for moving the carrier 16. The coil 20 and the inverter 21 function as a drive unit that is energized to generate the thrust for moving the carrier 16. The transfer path unit 11 includes a plurality of the drive units.

Each of the coils 20 in the transfer path unit 11 is connected to a current sensor 22. The current sensor 22 detects an actual coil current value that is a current value of the current flowing through the coil 20. Also, in the transfer path unit 11, a capacitor 23 that is an electrolytic capacitor is connected between the P bus 31 and the N bus 32. With the capacitor 23 being provided, in the transfer path unit 11, an abrupt voltage fluctuation in the PN buses is prevented. A voltage detector 33 is connected between the P bus 31 and the N bus 32. The voltage detector 33 detects, with respect to the potential of the N bus 32, a bus voltage that is a voltage between the P bus 31 and the N bus 32. The voltage detector 33 outputs the bus voltage that has been detected to a processor 27.

Each of the inverters 21 in the transfer path unit 11 is connected to a current controller 24 that controls the inverter 21. The current controller 24 calculates a voltage value of a voltage applied to the coil 20 on the basis of a command value of the current flowing through the coil 20 and the actual coil current value detected by the current sensor 22. The current controller 24 transmits a pulse width modulation (PWM) signal, which is obtained by comparing the calculated voltage value with a triangular wave, to the inverter 21. The current controller 24 transmits the PWM signal to the inverter 21, thereby causing the inverter 21 to perform switching. As a result, the current controller 24 applies, to the coil 20, the voltage for passing the current of a desired current value through the coil 20. The current controller 24 may calculate the voltage value of the voltage applied to the coil 20 by performing proportional integral differential (PID) control of the voltage applied to the coil 20 on the basis of a deviation between the current command value and the actual coil current value. In addition, the current controller 24 outputs the actual coil current value detected by the current sensor 22 to the processor 27.

The transfer path unit 11 includes a linear scale 25, the processor 27, and a communication slave station 28. The linear scale 25 is a detection unit that detects the position of the carrier 16 on the transfer path unit 11. The linear scale 25 is set up on the transfer path 10 when the plurality of the transfer path units 11 is coupled to each other to form the transfer path 10. The processor 27 is a central processing unit (CPU). The processor 27 may be an arithmetic unit, a processing unit, a microprocessor, a microcomputer, or a digital signal processor (DSP).

The linear scale 25 includes a plurality of position sensors 26. The position sensors 26 are each a sensor that detects a magnetic field, such as a Hall sensor or a magnetoresistive sensor. The position sensors 26 each detect a magnetic field of the permanent magnets 40 or a magnetic field of the permanent magnets 41. Here, the position sensor 26 is the Hall sensor equipped with two Hall elements. The interval between the two Hall elements corresponds to one-half of the magnetic pole pitch of the permanent magnets 41. Each of the Hall elements converts the magnetic field into an electric signal and outputs the electric signal. The electric signal output from each of the Hall elements changes as the carrier 16 moves. The waveform of the electric signal output from one of the Hall elements of the position sensor 26 is a sine wave. The waveform of the electric signal output from the other one of the Hall elements of the position sensor 26 is a cosine wave.

The electric signals from each of the position sensors 26 of the linear scale 25 are input to the processor 27. An analog to digital (AD) converter included together with the processor 27 detects the sine wave and the cosine wave. The processor 27 calculates an arctangent on the basis of information of the sine wave and information of the cosine wave, thereby detecting the position of the carrier 16 with respect to the position sensor 26. As a result, the processor 27 acquires position sensor information indicating a relative position of the carrier 16 with respect to the position sensor 26. Note that in FIG. 2, a communication line between each of the position sensors 26 and the processor 27 is not illustrated.

The processor 27 acquires the voltage value, which is the bus voltage that has been detected, from the voltage detector 33. The processor 27 acquires the actual coil current value from the current controller 24. The processor 27 performs calculation incorporating the actual coil current value when determining whether or not a component of the transfer system is in an overload state. The determination as to whether or not a component of the transfer system is in the overload state will be described later.

The communication slave station 28 is a communication slave station on the side of the transfer path unit 11. The data communication line 14 is connected to the communication slave station 28. In a case where the transfer path units 11 and the controller 12 are connected by daisy chain connection, two lines of the data communication lines 14 can be connected to the communication slave station 28. The communication slave station 28 receives the coil drive command transmitted from the controller 12. The communication slave station 28 transmits the current command included in the coil drive command to each of the plurality of the current controllers 24. As a result, the transfer path unit 11 controls the current flowing through each of the plurality of the coils 20 in accordance with the coil drive command.

Moreover, the communication slave station 28 acquires the position sensor information from the processor 27. The communication slave station 28 transmits the acquired position sensor information to the controller 12. The communication slave station 28 performs, for example, periodic communication of receiving the coil drive command and transmitting the position sensor information periodically. Instead of performing such periodic communication, the communication slave station 28 may receive the coil drive command and transmit the position sensor information aperiodically.

The transfer path unit 11 includes a temperature sensor 34. The temperature sensor 34 measures the temperature of the transfer path unit 11. The temperature sensor 34 outputs the temperature that has been measured to the processor 27. The processor 27 monitors the temperature measured by the temperature sensor 34.

As described above, the transfer path unit 11 mainly includes the function of controlling the energization of the coils 20 and the function of acquiring the position sensor information. Each of the plurality of the transfer path units 11 forming the transfer path 10 similarly controls the energization of the coils 20 and similarly acquires the position sensor information.

Next, overload protection in the transfer path unit 11 will be described. In each of the plurality of the transfer path units 11 included in the transfer system 1, the processor 27 determines whether or not each of the plurality of the drive units is in the overload state, and also determines whether or not the transfer path unit 11 is in the overload state. In each of the plurality of the transfer path units 11 included in the transfer system 1, the processor 27 executes overload protection processing that lowers the temperature of the drive unit determined to be in the overload state or the temperature of the transfer path unit 11 determined to be in the overload state.

The drive unit being in the overload state means that a component constituting the drive unit is overheated. That is, the drive unit being in the overload state refers to a state in which the temperature of the component constituting the drive unit exceeds the temperature at which the component can continue to operate normally. The transfer path unit 11 being in the overload state means that the entire interior of the transfer path unit 11 is overheated. That is, the transfer path unit 11 being in the overload state refers to a state in which the temperature of the interior of the transfer path unit 11 exceeds the temperature at which each of components included in the transfer path unit 11 can continue to operate normally. The components included in the transfer path unit 11 include the component constituting the drive unit and the component other than the component constituting the drive unit. The component other than the component constituting the drive unit is, for example, the capacitor 23, the processor 27, or the like.

Here, overload protection of the drive unit will be described. The processor 27 monitors whether or not one or a plurality of the components included in the drive unit is in the overload state. That is, the drive unit includes the components to be monitored as to whether or not the components are in the overload state. Here, the inverter 21 as a first component included in the drive unit and the coil 20 as a second component included in the drive unit are the components to be monitored.

The coil 20 and the inverter 21 each have an electrical resistance component. In the coil 20, a loss corresponding to the current value of the current flowing through the coil 20 is generated. In the inverter 21, a loss corresponding to the current value of the current flowing through the inverter 21 is generated. In the coil 20, a coil resistance causes the loss.

The inverter 21 includes, for example, a semiconductor switching element such as a metal oxide semiconductor field effect transistor (MOSFET) or an insulated gate bipolar transistor (IGBT), and a commutating diode. In the inverter 21, the loss due to a resistance at the time of energization of the MOSFET or the IGBT, or the loss such as a forward loss in the diode can be generated.

In the component such as the coil 20 or the inverter 21, heat is generated due to the loss, and when the temperature of the component exceeds an allowable temperature of the component, the component can deteriorate or break. The deterioration of the component or the breakage of the component here includes, for example, a decrease in the electromagnetic force generated by the coil 20, damage due to seizure or the like of the coil 20, sticking or breakage of the switching element in the inverter 21, breakage of the diode in the inverter 21, or the like. Therefore, the transfer path unit 11 performs overload protection on the coil 20 and the inverter 21 that are the components constituting the drive unit.

When a steady temperature rise of the component constituting the drive unit is denoted by "ΔT" [K], "ΔT" is expressed by the following Formula (1). In Formula (1), "$R_{th}$" [K/W] represents the thermal resistance of the component in a steady state. Also, "P" [W] represents the loss.

$$\Delta T = R_{th} \times P \tag{1}$$

The loss "P" is expressed by the following Formula (2). In Formula (2), "R" [Ω] represents the resistance of the component. Also, "I" [Arms] represents the root mean square of the current flowing through the component.

$$P = R \times I^2 \tag{2}$$

The processor 27 acquires the actual coil current value from the current controller 24. The processor 27 calculates, on the basis of the actual coil current value, the root mean square of the current flowing through the component constituting the drive unit. The current value of the current flowing through the component and causing the temperature of the component to reach the allowable temperature of the component is set as a maximum rated current value. When the root mean square of the current flowing through the component constituting the drive unit is equal to or less than the maximum rated current value of the component, the current can continuously flow through the component.

The thermal resistance of the component constituting the drive unit also includes thermal resistance due to a transient loss. The thermal resistance due to the transient loss is referred to as transient thermal resistance. Even when a current exceeding the maximum rated current value of the component flows through the component, if the current flows for a short time and does not cause the temperature of the component to exceed the allowable temperature thereof, the component does not break.

Figure 3:
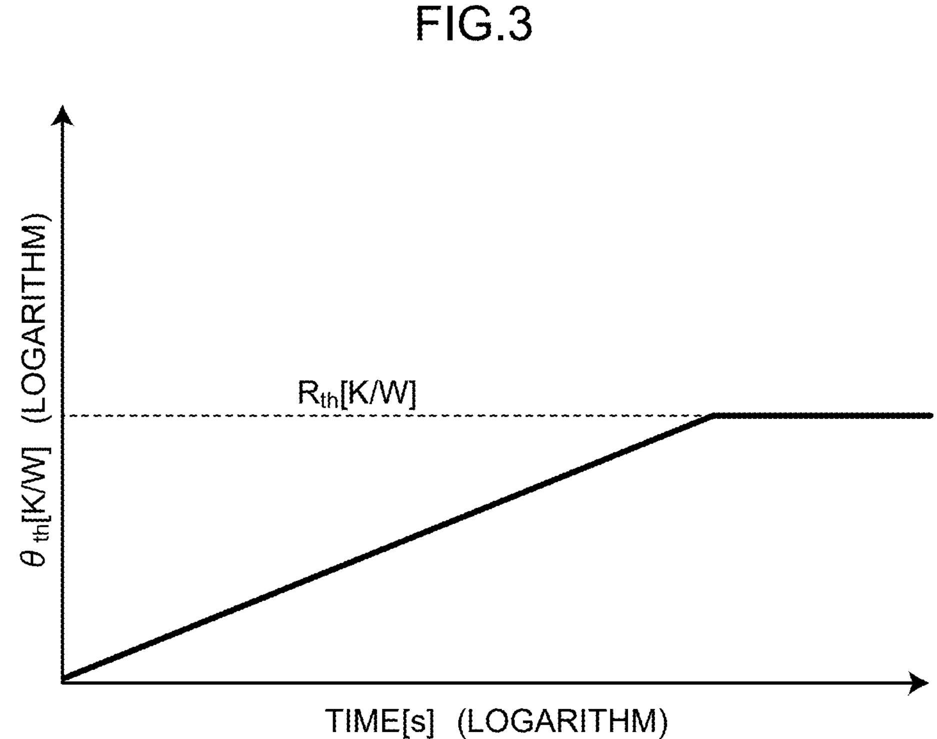
FIG. 3 is a graph for explaining thermal resistance of a component constituting a drive unit in the transfer system according to the first embodiment.

FIG. 3 is a graph for explaining the thermal resistance of the component constituting the drive unit in the transfer system 1 according to the first embodiment. FIG. 3 illustrates the graph representing a relationship between the transient thermal resistance and time. The vertical axis illustrated in FIG. 3 represents "$\theta_{th}$" [K/W] that is the transient thermal resistance. The horizontal axis illustrated in FIG. 3 represents time [s]. The vertical axis in FIG. 3 and the horizontal axis in FIG. 3 are both logarithmic scales.

As illustrated in FIG. 3, the transient thermal resistance increases with time and becomes constant after a certain time. When the transient thermal resistance becomes constant, the value of the transient thermal resistance coincides with the value of "$R_{th}$" that is the thermal resistance in a steady state.

Figure 4:
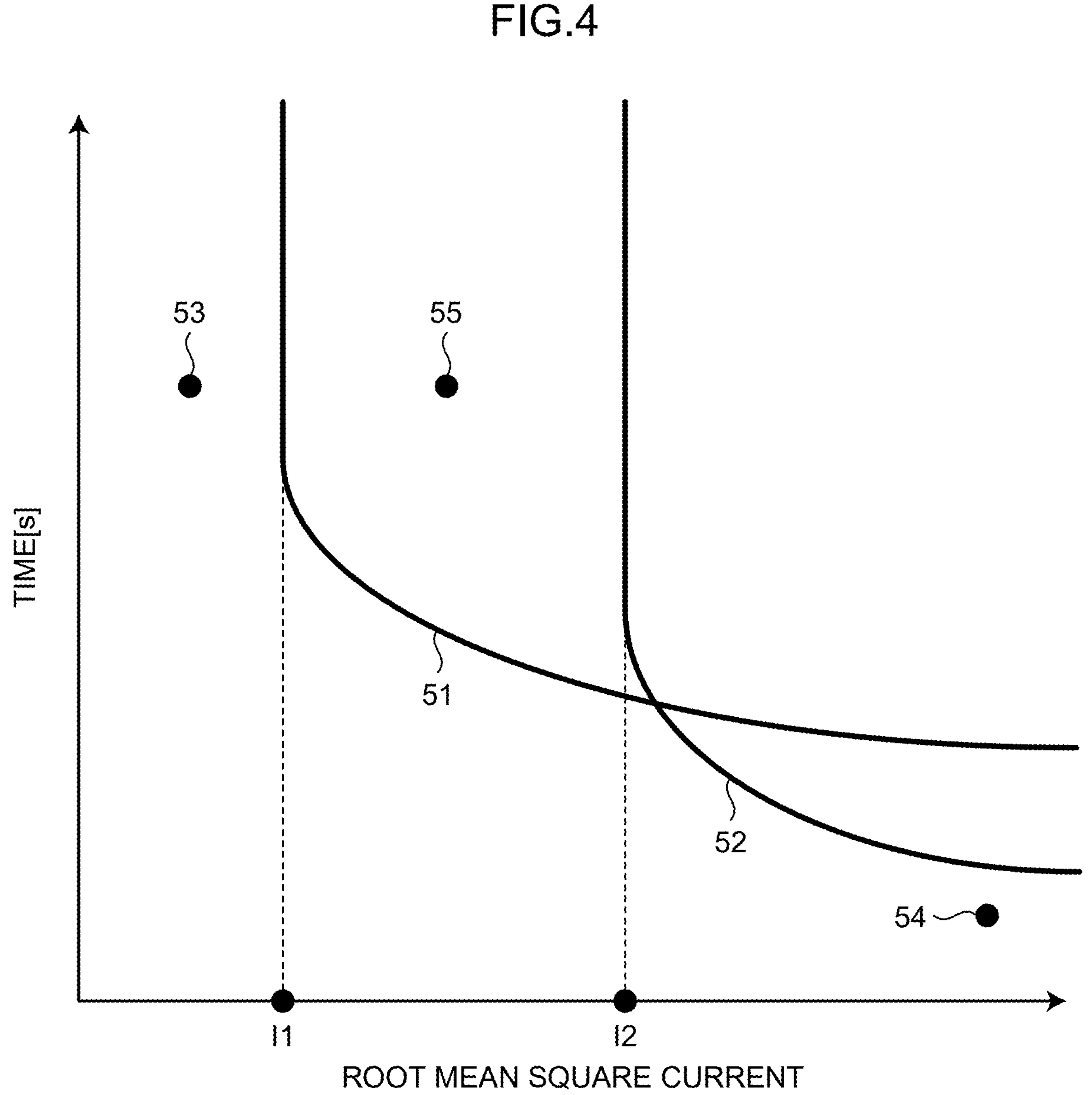
FIG. 4 is a graph illustrating an example of a first overload determination curve serving as a first criterion for an overload state in the transfer system according to the first embodiment.

FIG. 4 is a graph illustrating an example of a first overload determination curve serving as a first criterion for the overload state in the transfer system 1 according to the first embodiment. The first overload determination curve as the first criterion represents a relationship between a first load determination value and time. The first load determination value is a threshold of the current flowing through the component when the component is not in the overload state and when the component is in the overload state. The vertical axis illustrated in FIG. 4 represents time [s]. The horizontal axis illustrated in FIG. 4 represents a root mean square current that is the root mean square of the current flowing through the component. The horizontal axis illustrated in FIG. 4 can also be said to represent the amount of load applied to the component.

The processor 27 uses the relationship between the first load determination value and the time for which the current flows through the component, that is, uses the first criterion being the first overload determination curve set in advance to compare the root mean square of the current flowing through the component constituting the drive unit and the time for which the current flows through the component constituting the drive unit with the first overload determination curve, thereby determining whether or not the component is in the overload state. That is, the processor 27 compares the first criterion with the root mean square of the current flowing through the component constituting the drive unit and the time for which the current flows through the component, thereby determining whether or not the component constituting the drive unit is in the overload state. Note that the first overload determination curve as the first criterion may be set in advance in the processor 27, or the first overload determination curve recorded in a recording medium and set in advance may be read by the processor 27 and used for the operation of the processor 27.

A curve 51 illustrated in FIG. 4 is an example of the first overload determination curve for the coil 20. A curve 52 illustrated in FIG. 4 is an example of the first overload determination curve for the inverter 21. As indicated by the curve 51, the root mean square current as the first load determination value decreases with time and becomes constant after a certain time. On the curve 51, the root mean square current "I1" when the root mean square current becomes constant is the maximum rated current value of the coil 20. Also, as indicated by the curve 52, the root mean square current as the first load determination value decreases with time and becomes constant after a certain time. On the curve 52, the root mean square current "I2" when the root mean square current becomes constant is the maximum rated current value of the inverter 21.

Points 53, 54, and 55 each represent an energization pattern that is a combination of the time for which the current flows through the coil 20 and the inverter 21 and the root mean square of the current flowing through the coil 20 and the inverter 21. In the case of a first energization pattern represented by the point 53, the root mean square of the current flowing through the coil 20 and the inverter 21, which are the components constituting the drive unit, is smaller than the maximum rated current value of the coil 20 and smaller than the maximum rated current value of the inverter 21. Thus, in the case of the root mean square current of the first energization pattern, even when the current continuously flows through the coil 20 and the inverter 21, neither the coil 20 nor the inverter 21 is in the overload state. Therefore, the processor 27 determines that, for the first energization pattern, neither the coil 20 nor the inverter 21 is in the overload state. That is, the processor 27 determines that the drive unit is not in the overload state.

In the case of a second energization pattern represented by the point 54, the root mean square of the current flowing through the coil 20 and the inverter 21, which are the components constituting the drive unit, is larger than the maximum rated current value of the coil 20 and larger than the maximum rated current value of the inverter 21. However, the root mean square of the current flowing through the coil 20 and the inverter 21 is smaller than the first load determination value represented by the curve 51 and smaller than the first load determination value represented by the curve 52. In the case of the second energization pattern, the energization is transient and short in duration, so that neither the coil 20 nor the inverter 21 is in the overload state. Therefore, the processor 27 determines that, for the second energization pattern, neither the coil 20 nor the inverter 21 is in the overload state. That is, the processor 27 determines that the drive unit is not in the overload state.

In the case of a third energization pattern represented by the point 55, the root mean square of the current flowing through the coil 20 and the inverter 21, which are the components constituting the drive unit, is larger than the maximum rated current value of the coil 20 and smaller than the maximum rated current value of the inverter 21. The root mean square current of the current flowing through the coil 20 and the inverter 21 is larger than the first load determination value represented by the curve 51. In the case of the third energization pattern, the energization is not transient but long in duration, so that although the inverter 21 is not in the overload state, the coil 20 is in the overload state. Therefore, the processor 27 determines that, for the third energization pattern, the inverter 21 is not in the overload state but the coil 20 is in the overload state. Since the coil 20 is in the overload state, the processor 27 determines that the drive unit is in the overload state.

As described above, the processor 27 determines whether or not the drive unit is in the overload state on the basis of the root mean square of the current flowing through the components and the time for which the current flows through the components. Note that in the above description, the monitoring target in the drive unit is the coil 20 and the inverter 21, but the monitoring target may be either one of the coil 20 and the inverter 21. Moreover, as the monitoring target, a component other than the coil 20 and the inverter 21 may be added. The monitoring target may be any component through which a current flows. Then, the processor 27 uses an overload determination curve appropriate for the component constituting the drive unit to be monitored and determines whether or not the drive unit is in the overload state. Next, the determination on whether or not the drive unit is in the overload state will be described more specifically. The processor 27 acquires the actual coil current value from the current controller 24, and then performs first-order lag filtering on the actual coil current value. The processor 27 compares the energization pattern, which is the combination of the actual coil current value obtained after the first-order lag filtering and the time for which the current flows through the coil 20 and the inverter 21, with the first overload determination curve, thereby determining whether or not each of the coil 20 and the inverter 21 is in the overload state. The processor 27 includes the function of determining whether or not the coil 20 and the inverter 21, which are included in each of the plurality of the drive units provided in the transfer path unit 11, are in the overload state as described above.

Next, a specific example of overload protection processing in a case where the drive unit is determined to be in the overload state will be described. When the processor 27 finds the drive unit in which at least one of the coil 20 and the inverter 21 is determined to be in the overload state, the processor 27 transmits an alarm indicating that the drive unit is in the overload state to the transfer path units 11 in the transfer system 1.

The processor 27 of each of the transfer path units 11 executes the overload protection processing when the transfer path units 11 receive the alarm. In this example, when the transfer path units 11 receive the alarm, the processor 27 of each of the transfer path units 11 executes the overload protection processing that stops the energization of the drive units by the current controllers 24. Thus, the processor 27 of each of the transfer path units 11 performs control to stop all the carriers 16 in the transfer system 1. In this example, in a case where at least one of the plurality of the drive units in one of the plurality of the transfer path units 11 is determined to be in the overload state, the plurality of the transfer path units 11 executes the overload protection processing to stop all the carriers 16 on the transfer path 10. The overload protection processing in this case is processing that lowers the temperature of the drive unit by setting the load of the coil 20 and the load of the inverter 21 to zero.

Each of the transfer path units 11 may execute the overload protection processing to decelerate and then stop the carriers 16. Each of the transfer path units 11 may execute the overload protection processing to activate a regenerative brake by short-circuiting the coil 20. Also, the processor 27 of each of the transfer path units 11 may execute the overload protection processing that reduces the amount of current flowing to each of the drive units. In this case, the processor 27 of each of the transfer path units 11 performs control that reduces the amount of current to decelerate all the carriers 16 in the transfer system 1. The overload protection processing in this case is processing that lowers the temperature of the drive unit by reducing the load of the coil 20 and the load of the inverter 21.

As described above, in the case where at least one of the plurality of the drive units in one of the plurality of the transfer path units 11 is determined to be in the overload state, the plurality of the transfer path units 11 may execute the overload protection processing to decelerate all the carriers 16 on the transfer path 10. The transfer system 1 executes the overload protection processing to stop or decelerate all the carriers 16 on the transfer path 10, thereby being able to avoid a problem such as burnout due to overheating.

In the above description, the overload protection processing is executed to stop or decelerate all the carriers 16 on the transfer path 10, but the overload protection processing executed by the transfer system 1 is not limited thereto. In a case where at least one of the plurality of the drive units in one of the plurality of the transfer path units 11 is determined to be in the overload state, only the transfer path unit 11 including the drive unit determined to be in the overload state may execute the overload protection processing to stop or decelerate the carrier 16. In this case, the carrier 16 on the transfer path 10 formed by the transfer path unit 11 other than the transfer path unit 11 including the drive unit determined to be in the overload state is not stopped or decelerated. Then, when only the transfer path unit 11 including the drive unit determined to be in the overload state executes the overload protection processing to stop or decelerate the carrier 16, all the carriers 16 in the transfer path unit 11 including the drive unit determined to be in the overload state may be stopped or decelerated, or some of the carriers 16 in the transfer path unit 11 including the drive unit determined to be in the overload state may be stopped or decelerated. In this case, in only the transfer path unit 11 including the drive unit determined to be in the overload state, the processor 27 stops the energization of each of the drive units or reduces the amount of current flowing to each of the drive units. In this case as well, the transfer system 1 can avoid a problem such as burnout due to overheating.

Alternatively, in the case where at least one of the plurality of the drive units in one of the plurality of the transfer path units 11 is determined to be in the overload state, the overload protection processing executed may stop the energization of only the drive unit determined to be in the overload state. In this case as well, the transfer system 1 can avoid the problem such as burnout due to overheating.

Next, a description will be made of the determination as to whether or not the transfer path unit 11 is in the overload state and a specific example of an overload protection function in a case where the transfer path unit 11 is determined to be in the overload state. In each of the plurality of the transfer path units 11 included in the transfer system 1, the processor 27 determines whether or not the transfer path unit 11 is in the overload state. In each of the plurality of the transfer path units 11, the processor 27 executes the overload protection processing that lowers the temperature of the transfer path unit 11 determined to be in the overload state.

In a housing of the transfer path unit 11, electronic components such as the capacitor 23 and the processor 27 are provided in addition to the coil 20 and the inverter 21 that are the components constituting the drive unit. In general, the allowable temperature of the capacitor 23 and the allowable temperature of the processor 27 are lower than the allowable temperature of the coil 20 or the allowable temperature of the inverter 21.

Here, the loss in a case where the current value of the current flowing through all the coils 20 included in the transfer path unit 11 is the maximum rated current value of the coil 20 is defined as a worst loss of the transfer path unit 11. In the case where 12 pieces of the coils 20 are provided in the transfer path unit 11 as illustrated in FIG. 2, the worst loss of the transfer path unit 11 is expressed by the following Formula (3). In Formula (3), "$R_{coil}$" [Ω] represents a resistance value of the coil 20. Also, "$R_{inv}$" [Ω] represents a resistance of the inverter 21 being energized. Moreover, "$I_{crated}$" [Arms] represents the maximum rated current value of the coil 20.

Worst Loss of Transfer Path $$\text{unit} = 12 \times (R_{coil} + R_{inv}) \times I_{crated}^2 \tag{3}$$

When heat is generated by the resistance of the coil 20 and the resistance of the inverter 21, the heat is dispersed in the transfer path unit 11, transferred through a substrate or the like in the transfer path unit 11, or the like so that the temperature of the entire transfer path unit 11 increases. When the temperature of the entire transfer path unit 11 increases, the temperature of the coil 20 or the inverter 21 may not exceed the allowable temperature, but the temperature of the capacitor 23 or the processor 27 may exceed the allowable temperature.

As illustrated in FIG. 2, the length of the transfer path unit 11 is assumed to be longer than the length of the carrier 16. In this case, it can be said that it is rare for the current value of all the coils 20 in the transfer path unit 11 to be the maximum rated current value of the coil 20. Note that the length is defined as a length in the direction of travel of the carrier 16.

Figure 5:
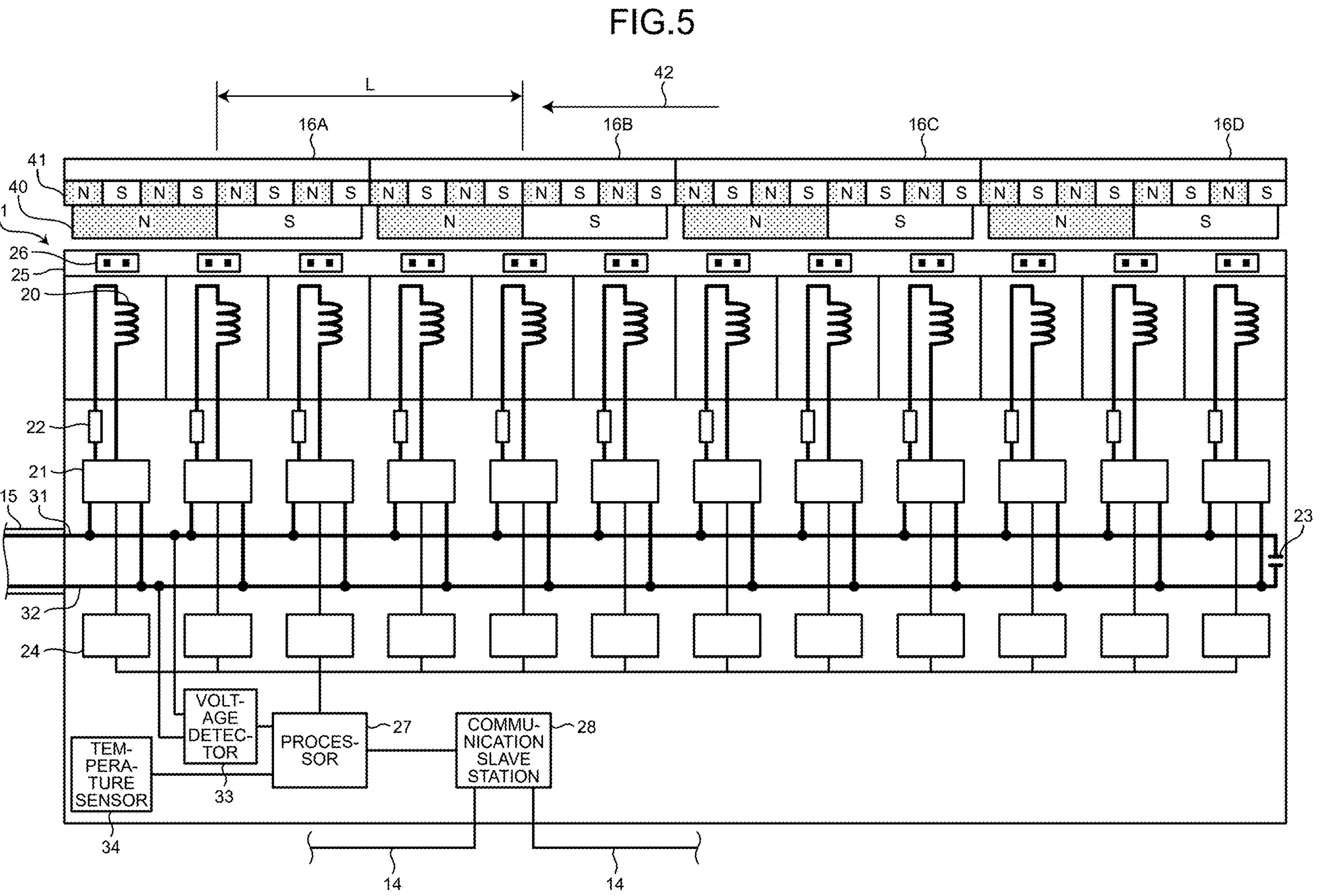
FIG. 5 is a first diagram for explaining a worst loss of the transfer path unit in the transfer system according to the first embodiment.

FIG. 5 is a first diagram for explaining the worst loss of the transfer path unit 11 in the transfer system 1 according to the first embodiment. FIG. 5 illustrates an example of a state in which the current value of the current flowing through all the coils 20 included in the transfer path unit 11 is the maximum rated current value of the coil 20. In FIG. 5, "L" [mm] indicates an interval between the carriers 16 adjacent to each other. The example illustrated in FIG. 5 assumes that "L" [mm] is almost the length of the carrier 16 in the direction of travel of the carrier 16. Here, four or more of the carriers 16 are assumed to be in the transfer system 1. FIG. 5 illustrates a state in which four of the carriers 16A, 16B, 16C, and 16D are located without any space therebetween on the transfer path unit 11. An arrow 42 indicates the direction of travel of the carrier 16.

In the transfer system 1, among the plurality of the coils 20 in the transfer path unit 11, when the rated current flows to only the coil 20 in the area where the carrier 16 is located, the carrier 16 can be moved without a decrease in the rated thrust. When the carriers 16 are located on all the coils 20 of the transfer path unit 11 and are kept on the move at the rated thrust and the rated speed on the transfer path unit 11, the loss of the transfer path unit 11 is the worst loss. However, in the transfer system 1 that is the moving magnet linear motor, it is thought that the plurality of the carriers 16 included in the transfer system 1 hardly operates in such an operation pattern. Therefore, it can be said that it is rare for the current value of all the coils 20 in the transfer path unit 11 to be the maximum rated current value of the coil 20.

Figure 6:
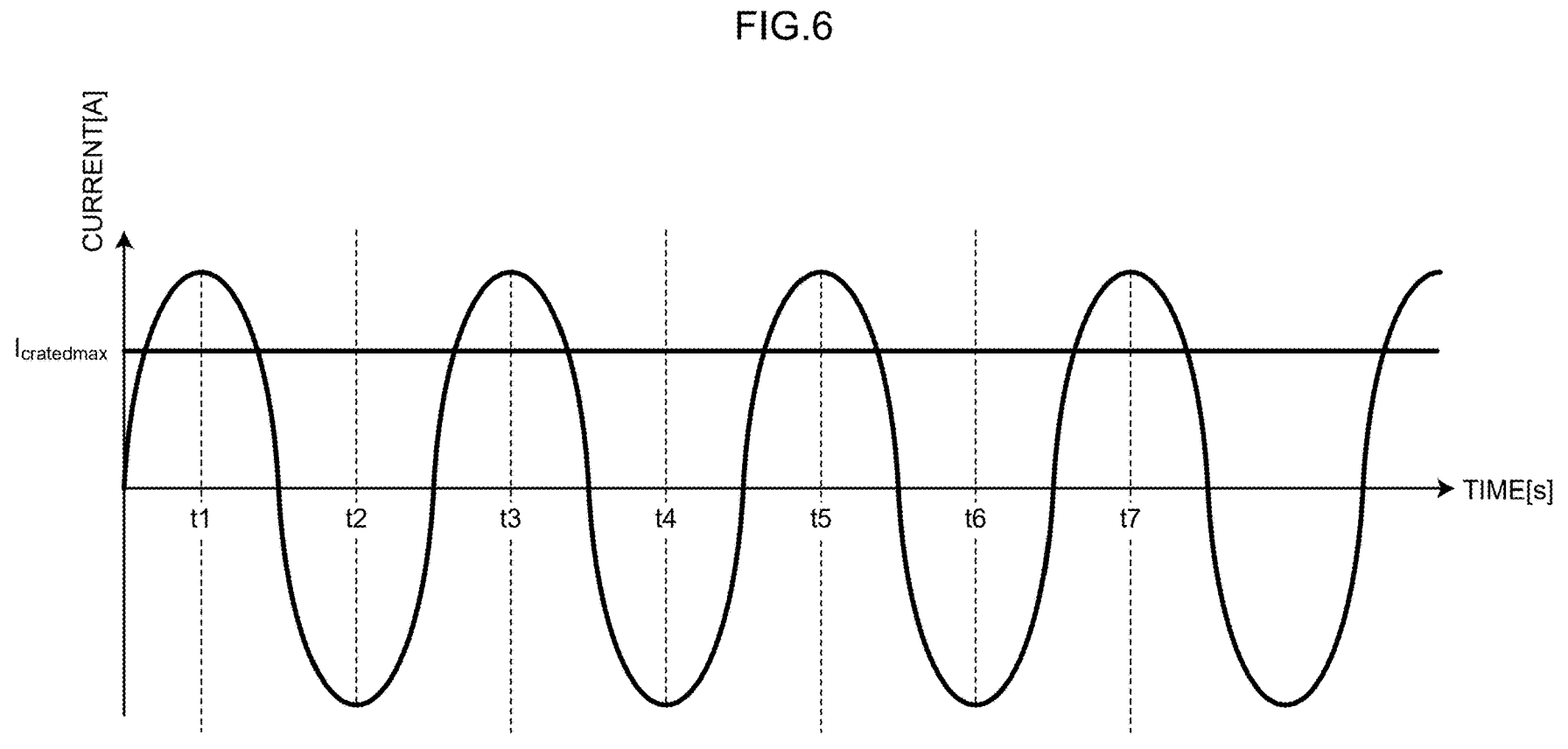

FIG. 6 is a second diagram for explaining the worst loss of the transfer path unit 11 in the transfer system 1 according to the first embodiment. FIG. 6 illustrates a waveform of the current flowing through one of the coils 20 in a case where the plurality of the carriers 16 passes on the transfer path unit 11 without any interval. That is, the waveform illustrated in FIG. 6 is the waveform of the current flowing through one of the coils 20 in a case where the loss of the transfer path unit 11 is the worst loss. The vertical axis illustrated in FIG. 6 represents the current [A] flowing through the coil 20. The horizontal axis illustrated in FIG. 6 represents time [s].

Here, it is assumed that the four carriers 16A, 16B, 16C, and 16D sequentially pass over one of the coils 20. In FIG. 6, time "t1" is when the center of the carrier 16A is immediately above the coil 20. Time "t2" is when the boundary between the carrier 16A and the carrier 16B is immediately above the coil 20. Time "t3" is when the center of the carrier 16B is immediately above the coil 20. Time "t4" is when the boundary between the carrier 16B and the carrier 16C is immediately above the coil 20. Time "t5" is when the center of the carrier 16C is immediately above the coil 20. Time "t6" is when the boundary between the carrier 16C and the carrier 16D is immediately above the coil 20. Time "t7" is when the center of the carrier 16D is immediately above the coil 20.

In order to constantly give the rated thrust to the carriers 16 passing successively without any interval, as illustrated in FIG. 6, the current having the waveform close to a sine wave is continuously passed through the coil 20. The currents flowing through the plurality of the coils 20 in the transfer system 1 have the same waveform and have phases that are varied as appropriate. When the rated thrust is constantly given to the carriers 16 passing successively without any interval, a root mean square of the current flowing through one of the coils 20 is denoted as "$I_{cratedmax}$".

Although it is rare for the loss of the transfer path unit 11 to be the worst loss, if the transfer system 1 is equipped with the overload protection function intended for the case where the loss of the transfer path unit 11 is the worst loss, the performance of overload protection is excessive for the performance appropriate for the operation of the transfer system 1. In a case where a configuration for overload protection, such as a cooling structure, is provided in the transfer path unit 11, the performance of overload protection is excessive so that the configuration of the transfer system 1 becomes unnecessarily large, and the manufacturing cost of the transfer system 1 becomes unnecessarily high.

In the first embodiment, a state in which the load is less than when the same thrust is constantly given to the carriers 16 passing successively without any interval is set as the overload state of the transfer path unit 11. In other words, the loss less than the worst loss of the transfer path unit 11 is set as the maximum rated loss that is the loss of the transfer path unit 11 when the transfer path unit 11 is in the overload state. The processor 27 executes the overload protection processing when the loss of the transfer path unit 11 reaches the maximum rated loss. As a result, the transfer system 1 can implement overload protection appropriate for the operation of the transfer system 1. When overload protection appropriate for the operation of the transfer system 1 can be implemented, the unnecessary increase in size of the configuration of the transfer system 1 and the unnecessary increase in the manufacturing cost of the transfer system 1 can be prevented.

A power loss that is the loss of the transfer path unit 11 is expressed by the following Formula (4). In Formula (4), "$P_{load}$" [W] represents the power loss of the transfer path unit 11. Also, "$I_{coil}$" [Arms] represents the root mean square of the current flowing through the coil 20. A sum on the right side of Formula (4) is a sum for all the coils 20 in the transfer path unit 11. The processor 27 calculates the loss of the transfer path unit 11 by Formula (4).

$$P_{load} = \sum \left( I_{coil}^{2} \right) \tag{4}$$

In a case where the loss of the transfer path unit 11 is the worst loss, the maximum rated loss $P_{loadrated}$ of the transfer path unit 11 is expressed by the following Formula (5). A sum on the right side of Formula (5) is a sum for all the coils 20 in the transfer path unit 11.

$$P_{loadrated} = \sum \left( I_{cratedmax}^{2} \right) \tag{5}$$

However, as described above, in the transfer system 1, it is rare for the root mean square current of all the coils 20 in the transfer path unit 11 to be "$I_{cratedmax}$". That is, it is rare for the loss of the transfer path unit 11 to be the worst loss expressed by Formula (5).

Figure 7:
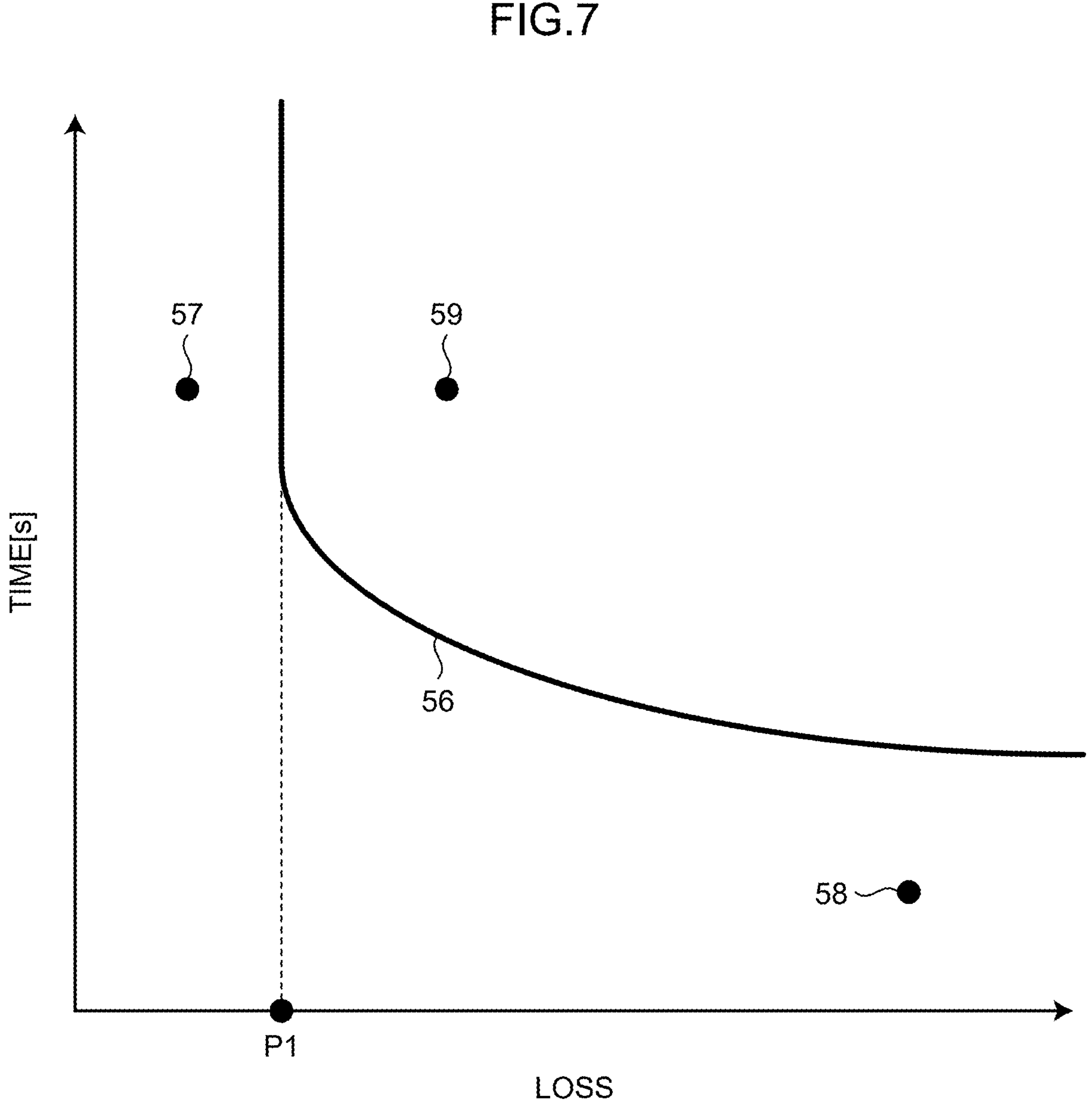
FIG. 7 is a graph illustrating an example of a second overload determination curve serving as a second criterion for the overload state in the transfer system according to the first embodiment.

FIG. 7 is a graph illustrating an example of a second overload determination curve serving as a second criterion for the overload state in the transfer system 1 according to the first embodiment. The second overload determination curve that is the second criterion represents a relationship between a second load determination value and time. The second load determination value is a threshold of the loss of the transfer path unit 11 when the transfer path unit 11 is not in the overload state and when the transfer path unit 11 is in the overload state. The vertical axis illustrated in FIG. 7 represents time [s]. The horizontal axis illustrated in FIG. 7 represents the loss of the transfer path unit 11. The horizontal axis illustrated in FIG. 7 can also be said to represent the amount of the load applied to the transfer path unit 11. Here, applying the load to the transfer path unit 11 means that a current flows through at least one of the plurality of the coils 20 in the transfer path unit 11.

The processor 27 calculates the root mean square of the current flowing through the coil 20 on the basis of the actual coil current value acquired from the current controller 24. The processor 27 uses the relationship between the second load determination value and the time for which the load is applied to the transfer path unit 11, that is, uses the second criterion being the second overload determination curve set in advance to compare the loss of the transfer path unit 11 obtained on the basis of the root mean square of the current flowing through each of the plurality of the drive units and the time for which the load is applied to the transfer path unit 11 with the second overload determination curve, thereby determining whether or not the transfer path unit 11 is in the overload state. That is, the processor 27 compares the second criterion with the loss of the transfer path unit 11 and the time for which the load is applied to the transfer path unit 11, thereby determining whether or not the transfer path unit 11 is in the overload state. Note that the second overload determination curve as the second criterion may be set in advance in the processor 27, or the second overload determination curve recorded in a recording medium and set in advance may be read by the processor 27 and used for the operation of the processor 27.

A curve 56 illustrated in FIG. 7 is an example of the second overload determination curve. As indicated by the curve 56, the value of the loss that is the second load determination value decreases with time and becomes constant after a certain time. That is, in the second overload determination curve, the second load determination value converges to a constant value over time. In the curve 56, "P1" that is the value of the loss when the value of the loss becomes constant is the value of the maximum rated loss of the transfer path unit 11. In other words, the loss of the transfer path unit 11 when the second load determination value is a constant value is the maximum rated loss.

Points 57, 58, and 59 each represent a loss pattern that is a combination of the time for which the load is applied to the transfer path unit 11 and the loss of the transfer path unit 11. In a case of a first loss pattern represented by the point 57, the loss of the transfer path unit 11 is less than the maximum rated loss. Thus, even when a state having the loss of the first loss pattern continues, the transfer path unit 11 is not in the overload state. Therefore, the processor 27 determines that, for the first loss pattern, the transfer path unit 11 is not in the overload state.

In a case of a second loss pattern represented by the point 58, the loss of the transfer path unit 11 is greater than the maximum rated loss. However, the loss of the transfer path unit 11 in the second loss pattern is less than a second load determination value represented by the curve 56. In the case of the second loss pattern, the load is applied to the transfer path unit 11 transiently for a short time, and thus the transfer path unit 11 is not in the overload state. Therefore, the processor 27 determines that, for the second loss pattern, the transfer path unit 11 is not in the overload state.

In a case of a third loss pattern represented by the point 59, the loss of the transfer path unit 11 is greater than the maximum rated loss. Moreover, the loss of the transfer path unit 11 in the third loss pattern is greater than the second load determination value represented by the curve 56. In the case of the third loss pattern, the load is applied to the transfer path unit 11 non-transiently for a long time, and thus the transfer path unit 11 is in the overload state. Therefore, the processor 27 determines that, for the third loss pattern, the transfer path unit 11 is in the overload state.

As described above, the processor 27 determines, on the basis of the loss of the transfer path unit 11 and the time for which the load is applied to the transfer path unit 11, whether or not the transfer path unit 11 is in the overload state.

Figure 8:
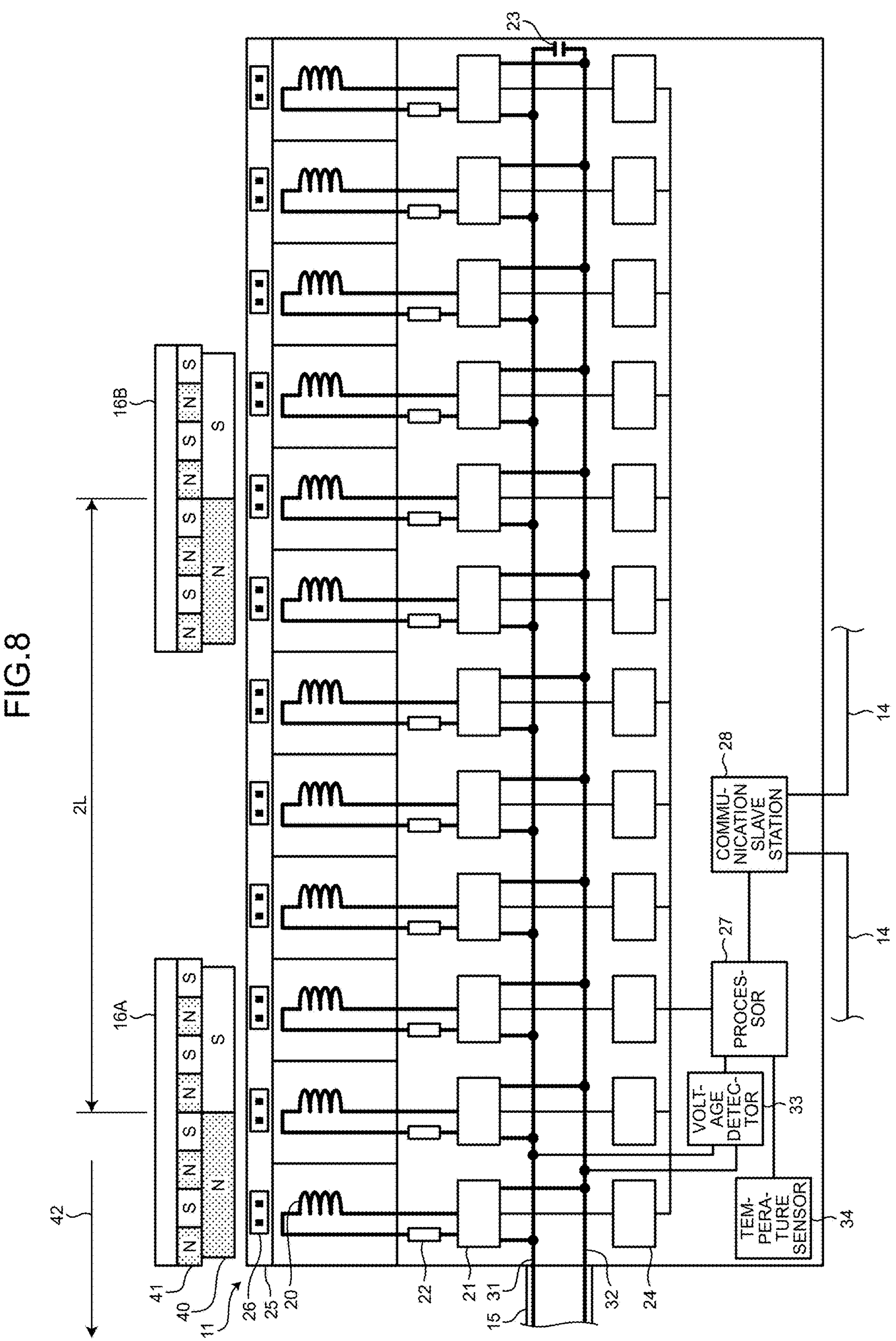
FIG. 8 is a first diagram for explaining a maximum rated loss of the transfer path unit in the transfer system according to the first embodiment.

Here, an example of setting the maximum rated loss of the transfer path unit 11 will be described. FIG. 8 is a first diagram for explaining the maximum rated loss of the transfer path unit 11 in the transfer system 1 according to the first embodiment. FIG. 8 illustrates an example of a state in which the loss of the transfer path unit 11 is the maximum rated loss. In the diagram, "L" [mm] represents the interval between the carriers 16 in the case where the carriers 16 line up without any space therebetween as illustrated in FIG. 5. In FIG. 8, the interval between the carriers 16 adjacent to each other is 2 L [mm]. FIG. 8 illustrates a state in which, on the transfer path unit 11, two of the carriers 16A and 16B are located at an interval of 2 L [mm].

In the example described here, the loss of the transfer path unit 11 in a case where the plurality of the carriers 16 is located at intervals corresponding to the length of one unit of the carrier 16 and is kept on the move at the rated thrust and the rated speed on the transfer path unit 11 is set as the maximum rated loss $P_{loadrated}$ of the transfer path unit 11. In this case, the maximum rated loss of the transfer path unit 11 is a loss smaller than the worst loss of the transfer path unit 11.

In the case where the carriers 16 on the transfer path unit 11 are kept on the move at the rated thrust and the rated speed, it is assumed that the interval between the carriers 16 rarely gets shorter than the length of one unit of the carrier 16. When the maximum rated loss is set to the loss in the operation pattern in which the plurality of the carriers 16 is located at intervals corresponding to the length of one unit of the carrier 16 and is kept on the move at the rated thrust and the rated speed on the transfer path unit 11, the operation can be continued without any problem for many operation patterns in which the transfer system 1 can operate. In addition, the transfer system 1 can implement appropriate overload protection on the transfer path unit 11 by the overload protection function having the performance appropriate for the operation of the transfer system 1.

Figure 9:
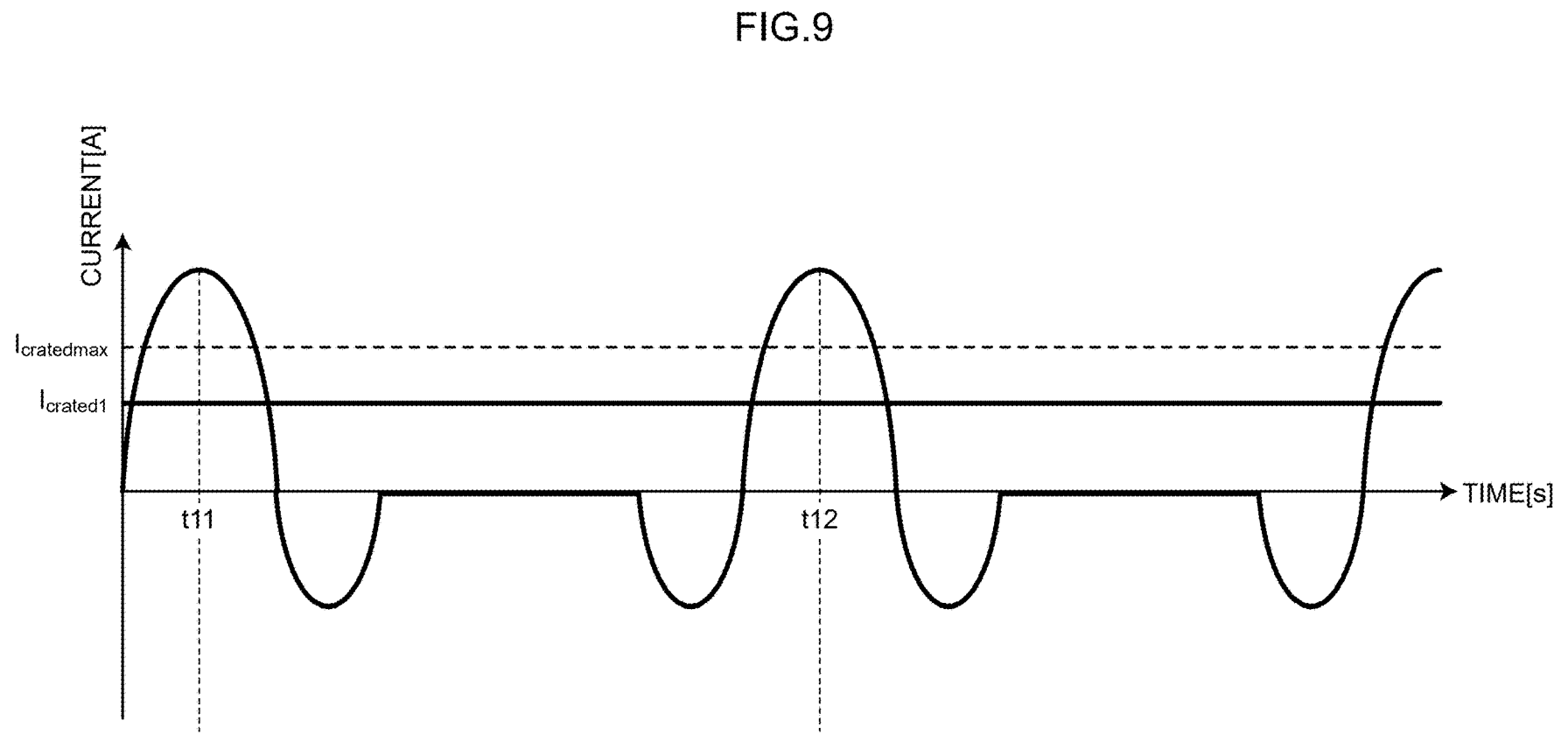

FIG. 9 is a second diagram for explaining the maximum rated loss of the transfer path unit 11 in the transfer system 1 according to the first embodiment. FIG. 9 illustrates a waveform of a current flowing through one of the coils 20 in the case where the plurality of the carriers 16 is located at intervals corresponding to the length of one unit of the carrier 16 and is kept on the move at the rated thrust and the rated speed on the transfer path unit 11. That is, the waveform illustrated in FIG. 9 is the waveform of the current flowing through one of the coils 20 in the case where the loss of the transfer path unit 11 is the maximum rated loss. The vertical axis illustrated in FIG. 9 represents the current [A] flowing through the coil 20. The horizontal axis illustrated in FIG. 9 represents time [s].

Here, it is assumed that the two carriers 16A and 16B sequentially pass over one of the coils 20 at an interval of 2 L [mm]. In FIG. 9, time "t11" is when the center of the carrier 16A is immediately above the coil 20. Time "t12" is when the center of the carrier 16B is immediately above the coil 20.

In FIG. 9, "$I_{crated1}$" is a root mean square of the current flowing through one of the coils 20 in the case where the loss of the transfer path unit 11 is the maximum rated loss. Also, as described with reference to FIG. 6, "$I_{cratedmax}$" is the root mean square of the current flowing through one of the coils 20 in the case where the loss of the transfer path unit 11 is the worst loss. Here, "$I_{crated1}$" is smaller than "$I_{cratedmax}$".

The maximum rated loss $P_{loadrated}$ of the transfer path unit 11 is expressed by the following Formula (6). A sum on the right side of Formula (6) is a sum for all the coils 20 in the transfer path unit 11.

$$P_{loadrated} = \sum (I_{crated1}{}^2) \tag{6}$$

With $I_{crated1} < I_{cratedmax}$ and Formula (6), the following Formula (7) is established.

$$P_{loadrated} < \sum (I_{cratedmax}{}^2) \tag{7}$$

Formula (7) represents that the maximum rated loss $P_{loadrated}$ of the transfer path unit 11 is smaller than the loss of the transfer path unit 11 when the value of the current flowing through each of the plurality of the coils 20 in the transfer path unit 11 is the maximum rated current value of the coil 20. In each of the transfer path units 11 of the transfer system 1, when the maximum rated loss $P_{loadrated}$ of the transfer path unit 11 satisfies Formula (7), the transfer system 1 can continue operation without any problem for many operation patterns in which the transfer system 1 can operate, and can also implement appropriate overload protection of the transfer path unit 11.

Note that, in the above description, the maximum rated loss is set to the loss in the case where the interval between the plurality of the carriers 16 corresponds to the length of one unit of the carrier 16, but the present disclosure is not limited thereto. The maximum rated loss only needs to be smaller than the worst loss, and can be set at will. For example, the maximum rated loss may be a loss in a case where the interval between the plurality of the carriers 16 is an interval corresponding to half of the length of the carrier 16.

The value of the maximum rated loss may be the same among the plurality of the transfer path units 11, or may be different for each of the transfer path units 11. For example, the value of the maximum rated loss of each of the transfer path units 11 may be adjusted on the basis of the size of the housing of the transfer path unit 11, the type of electronic components used in the transfer path unit 11, or the like. Alternatively, the transfer path unit 11 that is linear and the transfer path unit 11 that is curved may have different values of the maximum rated loss.

In the transfer system 1, the second load determination value on the second overload determination curve as the second criterion may be different for each of the transfer path units 11. That is, for the plurality of the transfer path units 11, the second load determination value different for each of the transfer path units 11 can be set. In this case, the transfer system 1 can set the second load determination value adjusted in accordance with the configuration of the transfer path unit 11. The transfer system 1 can determine whether or not the transfer path unit 11 is in the overload state in consideration of the configuration of the transfer path unit 11.

Next, a specific example of overload protection processing in a case where the transfer path unit 11 is determined to be in the overload state will be described. In the case where the transfer path unit 11 is determined to be in the overload state, the processor 27 transmits an alarm indicating that the transfer path unit 11 is in the overload state to each of the transfer path units 11 in the transfer system 1.

The processor 27 of each of the transfer path units 11 executes the overload protection processing upon receiving the alarm. In this example, upon receiving the alarm, the processor 27 of each of the transfer path units 11 executes the overload protection processing that stops the energization of the drive units by the current controllers 24. Alternatively, upon receiving the alarm, the processor 27 of each of the transfer path units 11 executes the overload protection processing that reduces the amount of current flowing to each of the drive units. Thus, the processor 27 of each of the transfer path units 11 performs control to stop or decelerate all the carriers 16 in the transfer system 1. In this example, in the case where one of the plurality of the transfer path units 11 is determined to be in the overload state, the plurality of the transfer path units 11 executes the overload protection processing to stop or decelerate all the carriers 16 on the transfer path 10.

As described above, each of the transfer path units 11 executes the overload protection processing that lowers the temperature of the transfer path unit 11 by setting the load of the transfer path unit 11 to zero or reducing the load of the transfer path unit 11. The transfer system 1 executes the overload protection processing to stop or decelerate all the carriers 16 on the transfer path 10, thereby being able to avoid a problem such as burnout due to overheating. Note that each of the transfer path units 11 may decelerate and then stop the carriers 16 as in the case where the drive unit is determined to be in the overload state. Each of the transfer path units 11 may execute the overload protection processing to activate a regenerative brake by short-circuiting the coil 20.

In the above description, the overload protection processing is executed to stop or decelerate all the carriers 16 on the transfer path 10, but the overload protection processing executed by the transfer system 1 is not limited thereto. In the case where one of the plurality of the transfer path units 11 is determined to be in the overload state, only the transfer path unit 11 determined to be in the overload state may execute the overload protection processing to stop or decelerate the carrier 16. In this case, the carrier 16 located on the transfer path 10 formed by the transfer path unit 11 other than the transfer path unit 11 determined to be in the overload state is not stopped or decelerated. Then, when only the transfer path unit 11 determined to be in the overload state executes the overload protection processing to stop or decelerate the carrier 16, all the carriers 16 in the transfer path unit 11 determined to be in the overload state may be stopped or decelerated, or some of the carriers 16 in the transfer path unit 11 determined to be in the overload state may be stopped or decelerated. In this case as well, the transfer system 1 can avoid a problem such as burnout due to overheating.

In the above description, the processor 27 acquires the actual coil current value detected by the current sensor 22, and determines whether or not the transfer path unit 11 is in the overload state on the basis of the root mean square current calculated on the basis of the actual coil current value. That is, the processor 27 determines whether or not the transfer path unit 11 is in the overload state on the basis of the root mean square of the current flowing through each of the plurality of the drive units. In this case, the processor 27 estimates the load of the transfer path unit 11 from the detected current flowing through each of the plurality of the drive units. The processor 27 may estimate the load of the transfer path unit 11 from a detected temperature of the transfer path unit 11. That is, the processor 27 may determine whether or not the transfer path unit 11 is in the overload state on the basis of the temperature detected by the temperature sensor 34. That is, when the load of the transfer path unit 11 is estimated from the detected temperature of the transfer path unit 11, instead of the sum of the root mean squares of the currents flowing through all the coils 20 in the transfer path unit 11 used to calculate the loss of the transfer path unit 11 described above, the temperature detected by the temperature sensor 34 is used to calculate the loss $P_{load}$ of the transfer path unit 11 and the maximum rated loss $P_{loadrated}$ of the transfer path unit 11, so that the second overload determination curve as the second criterion may be set in advance. In this case as well, the transfer system 1 can avoid a problem such as burnout due to overheating.

In the above description, the processor 27 executes the overload protection processing that stops the energization of the drive unit or reduces the amount of current flowing through the drive unit, but the overload protection processing is not limited thereto. The processor 27 may execute the overload protection processing that reduces a switching frequency of the inverter 21. The transfer path unit 11 may include a cooling structure that cools the interior of the transfer path unit 11. The cooling structure is, for example, a fan. The processor 27 may execute the overload protection processing that causes the cooling structure to operate. In the case of executing these overload protection processings as well, the transfer path unit 11 can lower the temperature of the drive unit determined to be in the overload state or the temperature of the transfer path unit 11 determined to be in the overload state.

According to the first embodiment, in the transfer system 1, the processor 27 determines whether or not each of the plurality of the drive units is in the overload state, and also determines whether or not the transfer path unit 11 is in the overload state. In each of the plurality of the transfer path units 11, the processor 27 executes the overload protection processing that lowers the temperature of the drive unit determined to be in the overload state or the temperature of the transfer path unit 11 determined to be in the overload state. The transfer system 1 performs the determination on the drive unit and the determination on the transfer path unit 11 separately so that, for each of the drive units, the maximum load that is the maximum allowable load is not reduced and, for the transfer path unit 11 as a whole, the maximum allowable load can be reduced as compared to a case where the maximum load is applied to all the drive units in the transfer path unit 11. The transfer system 1 does not reduce the maximum load for each of the drive units, thereby being able to move the carrier 16 without a decrease in the rated thrust. The transfer system 1 reduces the maximum allowable load for the transfer path unit 11 as a whole, thereby being able to implement overload protection appropriate for the operation of the transfer system 1. As a result, the transfer system 1 can implement overload protection appropriate for the operation of the transfer system 1.

Second Embodiment

In the transfer system 1, the transfer path units 11 are adjacent to each other. For example, when a first transfer path unit being one of two of the transfer path units 11 adjacent to each other experiences an increase in temperature, the heat of the first transfer path unit may be transferred to a second transfer path unit being the other one of the transfer path units 11 to cause an increase in temperature of the second transfer path unit. Thus, even in a case where the second transfer path unit is determined to be not in the overload state from a drive status of the second transfer path unit, the second transfer path unit can be overheated due to the conduction of heat from the first transfer path unit. In this case, it is difficult to perform appropriate overload protection on the second transfer path unit.

A second embodiment will describe a first example of overload protection for preventing the transfer path unit 11 from being overheated due to application of heat from one of the transfer path units 11 adjacent to each other to the other. The transfer system 1 according to the second embodiment includes a configuration similar to that of the transfer system 1 according to the first embodiment. In the second embodiment, components identical to those in the above first embodiment are denoted by the same reference numerals as those assigned to such components in the first embodiment, and processing different from that of the first embodiment will be mainly described.

In the second embodiment, the processor 27 of each of the plurality of the transfer path units 11 determines whether or not the transfer path unit 11 is in a high load state. The high load state is a state in which the load is less than that in the overload state, and is a state expected to reach the overload state. In a case where one of the plurality of the transfer path units 11 is determined to be in the high load state, the processor 27 of a second transfer path unit, which is the transfer path unit 11 adjacent to a first transfer path unit being the transfer path unit 11 determined to be in the high load state, performs a correction to set the second load determination value smaller than a preset value in the relationship represented by the second overload determination curve set in advance as the second criterion. The processor 27 of the second transfer path unit determines whether or not the second transfer path unit is in the overload state on the basis of the second criterion on which the corrected has been made to set the second load determination value smaller than the preset value.

The power loss that is the loss of the transfer path unit 11 is expressed by the above Formula (4). The processor 27 calculates the loss of the transfer path unit 11 by Formula (4).

In the transfer path unit 11, a loss value serving as a threshold for determining whether or not the transfer path unit 11 is in the high load state is set in advance. Here, the loss value serving as the threshold is referred to as a high load determination value. The processor 27 compares the value of "$P_{load}$" that is the loss calculated by Formula (4) with "$P_{loadh}$" that is the high load determination value.

If $P_{load}>P_{loadh}$ holds, the processor 27 determines that the transfer path unit 11 is in the high load state. When determining that the transfer path unit 11 is in the high load state, the processor 27 transmits an alarm indicating that the transfer path unit 11 is in the high load state to the controller 12. The first transfer path unit, which is the transfer path unit 11 determined to be in the high load state, transmits the alarm to the controller 12 to notify the controller 12 that the first transfer path unit is in the high load state.

Upon receiving the alarm from the first transfer path unit, the controller 12 transmits an alarm indicating that the first transfer path unit is in the high load state to the second transfer path unit. For example, in a case where the transfer path unit 11A in the transfer system 1 illustrated in FIG. 1 is the first transfer path unit, each of the transfer path unit 11B and the transfer path unit 11H is the second transfer path unit.

Upon receiving the alarm from the controller 12, the processor 27 of the second transfer path unit corrects the value of the maximum rated loss $P_{loadrated}$ of the transfer path unit 11 to a value smaller than a preset value. That is, the processor 27 of the second transfer path unit corrects the second load determination value on the second overload determination curve to a value smaller than a preset value. As just described, the processor 27 of the second transfer path unit receives the notification, from the controller 12, that the first transfer path unit is in the high load state, and then corrects the second criterion represented by the second overload determination curve.

The processor 27 of the second transfer path unit determines whether or not the second transfer path unit is in the overload state on the basis of the second overload determination curve as the second criterion that has been corrected. As a result, when the conduction of heat from the first transfer path unit causes an increase in temperature of the second transfer path unit, the transfer system 1 can appropriately execute the overload protection processing of the second transfer path unit.

According to the second embodiment, in the transfer system 1, when the first transfer path unit is in the high load state, the second transfer path unit performs the correction of setting the second load determination value smaller than the preset value on the second overload determination curve. As a result, the transfer system 1 can prevent the transfer path unit 11 from being overheated due to the application of heat from one of the transfer path units 11 adjacent to each other to the other.

Third Embodiment

A third embodiment will describe a second example of overload protection for preventing the transfer path unit 11 from being overheated due to application of heat from one of the transfer path units 11 adjacent to each other to the other. The transfer system 1 according to the third embodiment includes a configuration similar to that of the transfer system 1 according to the first embodiment. In the third embodiment, components identical to those in the above first or second embodiment are denoted by the same reference numerals as those assigned to such components in the first or second embodiment, and processing different from that of the first or second embodiment will be mainly described.

In the second embodiment, the processor 27 of each of the transfer path units 11 determines whether or not the transfer path unit 11 is in the high load state. In the third embodiment, the controller 12 determines whether or not each of the plurality of the transfer path units 11 is in the high load state.

The power loss that is the loss of the transfer path unit 11 is expressed by the above Formula (4). The processor 27 of the each of the transfer path units 11 calculates the loss of the transfer path unit 11 by Formula (4). The processor 27 transmits the value of the loss $P_{load}$ calculated by Formula (4) to the controller 12.

In the controller 12, the high load determination value $P_{loadh}$ for determining whether or not the transfer path unit 11 is in the high load state is set in advance. For each of the plurality of the transfer path units 11, the controller 12 compares the value of the loss $P_{load}$ calculated by Formula (4) with "$P_{loadh}$". The controller 12 thus determines whether or not each of the plurality of the transfer path units 11 is in the high load state.

If $P_{load}>P_{loadh}$ holds in any of the transfer path units 11, the controller 12 determines that the transfer path unit 11 in which $P_{load}>P_{loadh}$ holds is in the high load state. The controller 12 transmits an alarm indicating that a first transfer path unit is in the high load state to a second transfer path unit adjacent to the first transfer path unit determined to be in the high load state. The controller 12 transmits the alarm to the second transfer path unit to notify the second transfer path unit that the first transfer path unit is in the high load state.

Upon receiving the alarm from the controller 12, the processor 27 of the second transfer path unit corrects the value of the maximum rated loss $P_{loadrated}$ of the transfer path unit 11 to a value smaller than a preset value. That is, the processor 27 of the second transfer path unit corrects the second load determination value on the second overload determination curve to a value smaller than a preset value. As just described, the processor 27 of the second transfer path unit receives the notification, from the controller 12, that the first transfer path unit is in the high load state, and then corrects the second criterion represented by the second overload determination curve.

The processor 27 of the second transfer path unit determines whether or not the second transfer path unit is in the overload state on the basis of the second overload determination curve as the second criterion that has been corrected. As a result, when the second transfer path unit experiences an increase in temperature due to the conduction of heat from the first transfer path unit to be in the overload state, the second transfer path unit can execute the overload protection processing.

In the above description, the processor 27 of the second transfer path unit corrects the second load determination value to the value smaller than the preset value. In the third embodiment, the controller 12 may correct the second load determination value to the value smaller than the preset value. In this case, the controller 12 holds, for each of the plurality of the transfer path units 11, the second criterion represented by the second overload determination curve. For the second transfer path unit adjacent to the first transfer path unit determined to be in the high load state, the controller 12 corrects the second criterion represented by the second overload determination curve. The controller 12 transmits information indicating the second criterion that has been corrected to the second transfer path unit.

The processor 27 of the second transfer path unit acquires the information transmitted from the controller 12, and determines whether or not the second transfer path unit is in the overload state on the basis of the second overload determination curve being the second criterion that has been corrected. As a result, when the conduction of heat from the first transfer path unit causes the increase in temperature of the second transfer path unit, the transfer system 1 can appropriately execute the overload protection processing of the second transfer path unit.

The controller 12 may adjust the value of "$P_{loadrated}$" of the second transfer path unit in accordance with the value of "$P_{load}$" of the first transfer path unit determined to be in the high load state. For example, in a case where a load factor $P_{load}/P_{loadh}$ of the first transfer path unit is 0.9, the controller 12 multiplies the value of the maximum rated loss $P_{loadrated}$ of the second transfer path unit by 0.9 to adjust the value of "$P_{loadrated}$" of the second transfer path unit. In this method, the value of "$P_{loadrated}$" of the second transfer path unit is multiplied by the load factor of the first transfer path unit to be adjusted, but the controller 12 can adjust the value of "$P_{loadrated}$" of the second transfer path unit by any method in accordance with the value of "$P_{load}$" of the first transfer path unit. A program for adjusting the value of "$P_{loadrated}$" of the second transfer path unit is set in the controller 12 in advance.

According to the third embodiment, in the transfer system 1, when the first transfer path unit is in the high load state, the second transfer path unit performs the correction of setting the second load determination value smaller than the preset value on the second overload determination curve. As a result, the transfer system 1 can prevent the transfer path unit 11 from being overheated due to the application of heat from one of the transfer path units 11 adjacent to each other to the other.

Fourth Embodiment

In the transfer system 1 according to the first to third embodiments, the controller 12 generates an operation command indicating a mode of movement for each of the plurality of the carriers 16, and generates a position command for each of the carriers 16 on the basis of the operation command. The operation command includes information related to the movement of the carrier 16 such as acceleration, deceleration, and speed of movement. A fourth embodiment will describe an example of applying machine learning to the generation of the operation command.

For example, it is assumed that operating information acquired indicates that, two seconds after a certain time point, the carrier 16 reaches a target position three meters ahead of a current position. In this case, as patterns of an operation command for moving the carrier 16, various patterns are possible. One of the possible patterns is a pattern in which the carrier 16 is moved by trapezoidal acceleration/deceleration from a start point to an end point for the two seconds. Another pattern is a pattern in which the carrier 16 is moved by trapezoidal acceleration/deceleration for one second from the start point and is stopped for the last one second, a pattern in which the carrier 16 is stopped for one second from the start point and is moved by trapezoidal acceleration/deceleration for the last one second, or the like. For the operating information acquired, an infinite number of patterns are possible as the patterns of the operation command.

In the transfer system 1, among values of power consumed by the transfer path units 11, the maximum value among the plurality of the transfer path units 11 is preferably as small as possible. In the following description, among the values of power used by the transfer path units 11, the maximum value among the plurality of the transfer path units 11 is referred to as a maximum power value. In the fourth embodiment, from the infinite number of patterns of the operation command, the operation command that decreases the maximum power value is derived by machine learning.

Figure 10:
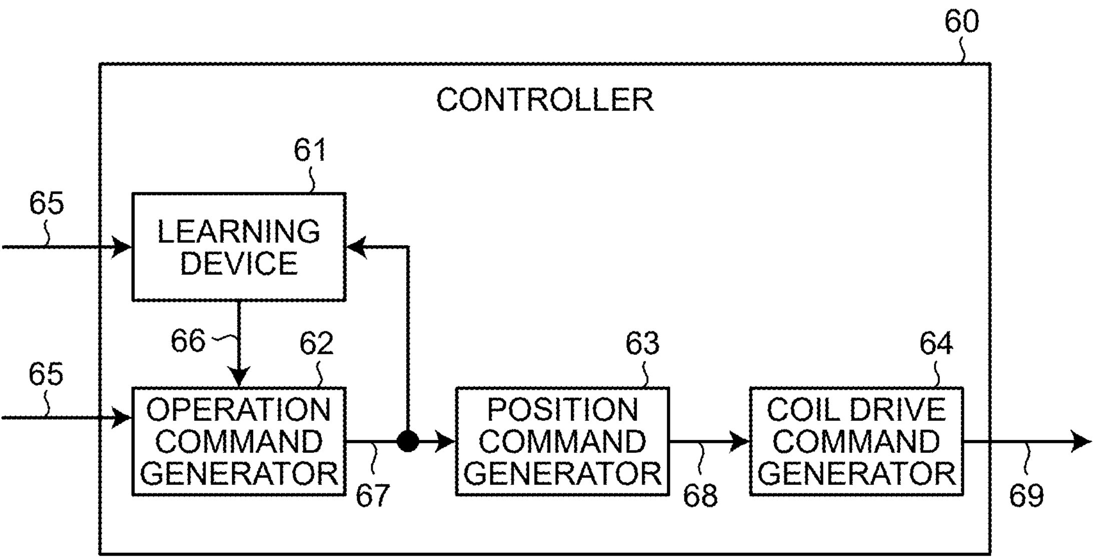
FIG. 10 is a diagram illustrating an exemplary configuration of a controller included in a transfer system according to a fourth embodiment.

FIG. 10 is a diagram illustrating an exemplary configuration of a controller 60 included in the transfer system 1 according to the fourth embodiment. The controller 60 includes a learning device 61, an operation command generator 62, a position command generator 63, and a coil drive command generator 64.

The operation command generator 62 receives operating information 65. The operation command generator 62 generates an operation command 67 on the basis of the operating information 65. The operation command 67 generated by the operation command generator 62 is input to the position command generator 63. The position command generator 63 generates a position command 68 on the basis of the operation command 67. The position command 68 generated by the position command generator 63 is input to the coil drive command generator 64.

The coil drive command generator 64 generates a coil drive command 69 on the basis of the position command 68. The controller 60 transmits the coil drive command 69 generated by the coil drive command generator 64 to the transfer path units 11. The controller 60 transmits the coil drive command 69 to the transfer path units 11, thereby controlling the movement of the carriers 16.

The learning device 61 receives the operating information 65 and the operation command 67. The learning device 61 learns a relationship between the operating information 65 and the operation command 67 that decreases the maximum power value. The learning device 61 outputs a trained model 66 that is a result of learning. The operation command generator 62 acquires the trained model 66 from the learning device 61. The operation command generator 62 inputs the operating information 65 to the trained model 66 to infer the operation command 67 that decreases the maximum power value. The operation command generator 62 generates the operation command 67 by such inference.

Figure 11:
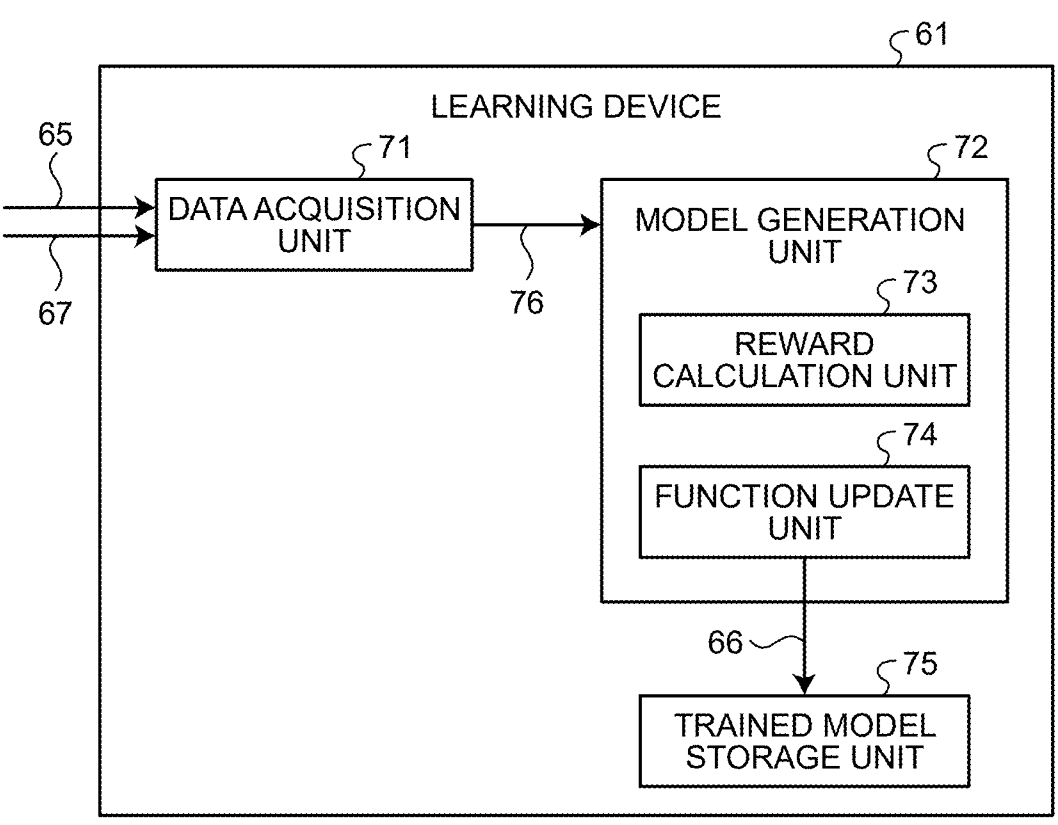
FIG. 11 is a diagram illustrating an exemplary configuration of a learning device included in the controller according to the fourth embodiment.

FIG. 11 is a diagram illustrating an exemplary configuration of the learning device 61 included in the controller 60 according to the fourth embodiment. The learning device 61 includes a data acquisition unit 71, a model generation unit 72, and a trained model storage unit 75.

The data acquisition unit 71 acquires training data 76 and creates a data set in which the training data 76 is put together. The training data 76 contains the operating information 65 and the operation command 67. That is, the data acquisition unit 71 acquires the training data 76 containing the operating information 65 and the operation command 67. The training data 76 is input to the model generation unit 72.

The model generation unit 72 generates the trained model 66 using the training data 76. The model generation unit 72 generates the trained model 66, which is used for the inference of the operation command 67 from the operating information 65, on the basis of the training data 76. The trained model storage unit 75 stores the trained model 66.

A learning algorithm used by the model generation unit 72 can be a known algorithm such as supervised learning, unsupervised learning, or reinforcement learning. As an example, a case will be described where reinforcement learning is applied as the learning algorithm used by the model generation unit 72. In reinforcement learning, a subject as an agent acting in a certain environment observes a current state and determines an action to take. The agent receives a reward from the environment by choosing an action and learns a policy that maximizes the reward through a series of actions. As representative methods of reinforcement learning, Q-learning, TD-learning, and the like are known.

For example, in the case of Q-learning, an action-value table that is a typical update expression of an action-value function Q (s, a) is expressed by the following Formula (8). The action-value function Q (s, a) represents an action value "Q" that is a value of an action of choosing an action "a" under an environment "s".

Formula 1

$$Q(s_t, a_t) \leftarrow Q(s_t, a_t) + \alpha(r_{t+1} + \gamma \max_a Q(s_{t+1}, a_t) - Q(s_t, a_t)) \quad (8)$$

In Formula (8), "$s_t$" represents an environment at time "t". An action at time "t" is represented by "$a_t$". The action "$a_t$" changes the environment to "$s_{t+1}$". A reward earned by the change in the environment is represented by "$r_{t+1}$". A discount factor is represented by "γ". The discount factor "γ" satisfies $0<\gamma\leq 1$. A learning rate is represented by "α". The learning rate "α" satisfies $0<\alpha\leq 1$. The operating information 65 corresponds to the environment "$s_t$". The operation command 67 corresponds to the action "$a_t$".

The update expression expressed by Formula (8) increases the action value "Q" if the action value of the action "a" that is the best action at time "t+1" is higher than the action value "Q" of the action "α" taken at time "t", or decreases the action value "Q" in an opposite case. In other words, the action-value function Q (s, a) is updated such that the action value "Q" of the action "a" at time "t" approaches the best action value at time "t+1". As a result, the best action value in a certain environment sequentially propagates to action values in previous environments.

The model generation unit 72 includes a reward calculation unit 73 and a function update unit 74. The reward calculation unit 73 calculates a reward on the basis of the data set. The function update unit 74 updates a function for determining the operation command 67 in accordance with the reward calculated by the reward calculation unit 73.

Specifically, the reward calculation unit 73 calculates a reward "r" on the basis of the maximum power value. For example, the reward calculation unit 73 increases the reward "r" when the maximum power value decreases. The reward calculation unit 73 increases the reward "r" by giving "1" as a value of the reward. Note that the value of the reward is not limited to "1". On the other hand, the reward calculation unit 73 decreases the reward "r" when the maximum power value increases. The reward calculation unit 73 decreases the reward "r" by giving "−1" as a value of the reward. Note that the value of the reward is not limited to "−1".

The function update unit 74 updates the function that is a model for determining the operation command 67 in accordance with the reward calculated by the reward calculation unit 73. The function can be updated by, for example, updating the action-value table according to the data set. The action-value table is a data set in which an arbitrary action and its action value are stored in association with each other in a table form. For example, in the case of Q-learning, the action-value function Q $(s_t, a_t)$ expressed by the above Formula (8) is used as the function for determining the operation command 67.

Figure 12:
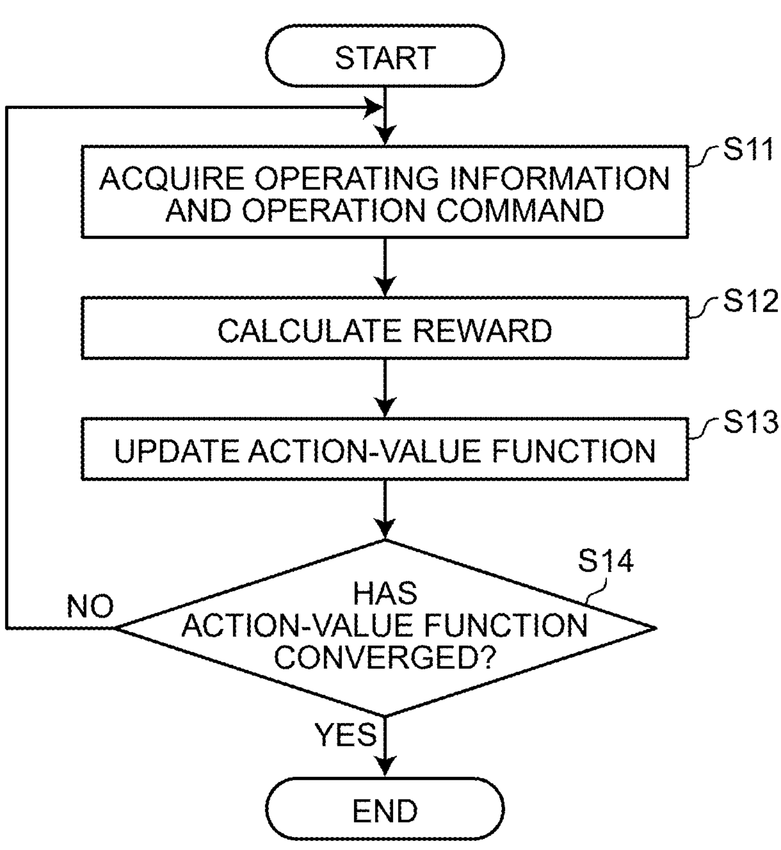
FIG. 12 is a flowchart illustrating a processing procedure of the learning device included in the controller according to the fourth embodiment.

FIG. 12 is a flowchart illustrating a processing procedure of the learning device 61 included in the controller 60 according to the fourth embodiment. With reference to the flowchart of FIG. 12, a reinforcement learning method that updates the action-value function Q (s, a) will be described.

In step S11, the learning device 61 acquires the operating information 65 and the operation command 67 by the data acquisition unit 71. That is, the learning device 61 acquires the training data 76. The data acquisition unit 71 outputs the data set obtained by putting together the training data 76 to the model generation unit 72.

In step S12, the learning device 61 calculates the reward by the reward calculation unit 73. The reward calculation unit 73 calculates the reward for a combination of the operating information 65 for each of the carriers 16 and the operation command 67 for each of the carriers 16. The reward calculation unit 73 increases or decreases the reward on the basis of the maximum power value.

In step S13, the learning device 61 updates the action-value function by the function update unit 74. The function update unit 74 updates the action-value function Q (s, a) on the basis of the reward calculated in step S12. The learning device 61 updates the action-value function Q $(s_t, a_t)$ stored in the trained model storage unit 75.

In step S14, the learning device 61 determines, by the function update unit 74, whether or not the action-value function Q (s, a) has converged. The function update unit 74 determines that the action-value function Q (s, a) has converged when the action-value function Q (s, a) is no longer updated in step S13.

If determining that the action-value function Q (s, a) has not converged (No in step S14), the learning device 61 returns to step S11 of the procedure. On the other hand, if determining that the action-value function Q (s, a) has converged (Yes in step S14), the learning device 61 ends the processing according to the procedure illustrated in FIG. 12. Note that the learning device 61 may continue learning by returning to step S11 of the procedure after step S13 without making the determination in step S14. The trained model storage unit 75 stores the trained model 66 that is the action-value function Q (s, a) generated.

The fourth embodiment has described the case where reinforcement learning is applied as the learning algorithm used by the learning device 61, but learning other than reinforcement learning may be applied as the learning algorithm. The learning device 61 may execute machine learning using a known learning algorithm other than reinforcement learning such as deep learning, neural network, genetic programming, inductive logic programming, or support vector machine.

The learning device 61 illustrated in FIG. 10 and FIG. 11 is a device built in the controller 60. The learning device 61 may be a device external to the controller 60. The learning device 61 as the device external to the controller 60 is included in the transfer system 1. The learning device 61 may be a device connectable to the controller 60 via a network. The learning device 61 may be a device on a cloud server. In the example illustrated in FIG. 11, the trained model storage unit 75 is built in the learning device 61. The trained model storage unit 75 may be provided outside the learning device 61.

The learning device 61 may learn the operation command 67 that decreases the maximum power value in accordance with a data set created for a plurality of the transfer systems 1. The learning device 61 may acquire the operating information 65 and the operation command 67 from a plurality of the transfer systems 1 used in the same location, or may acquire the operating information 65 and the operation command 67 from a plurality of the transfer systems 1 used in different locations. The operating information 65 and the operation command 67 may be collected from a plurality of the transfer systems 1 operating independently of each other in a plurality of locations. After the operating information 65 and the operation command 67 start to be collected from the plurality of the transfer systems 1, a new unit of the transfer system 1 may be added to the target from which the operating information 65 and the operation command 67 are collected. Also, after the operating information 65 and the operation command 67 start to be collected from the plurality of the transfer systems 1, some of the plurality of the transfer systems 1 may be excluded from the target from which the operating information 65 and the operation command 67 are collected.

The learning device 61 that has performed learning for one of the transfer systems 1 may perform learning for a different one of the transfer systems 1. The learning device 61 that performs learning for the different one of the transfer systems 1 can update the trained model 66 by performing relearning for the different one of the transfer systems 1.

Figure 13:
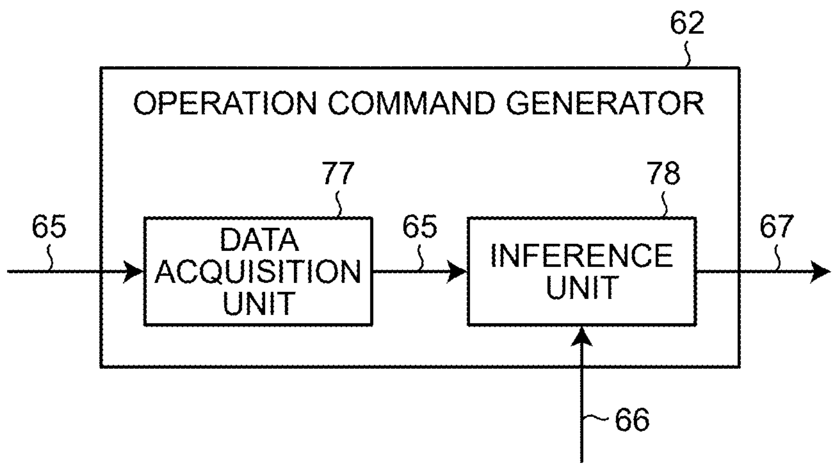
FIG. 13 is a diagram illustrating an exemplary configuration of an operation command generator included in the controller according to the fourth embodiment.

FIG. 13 is a diagram illustrating an exemplary configuration of the operation command generator 62 included in the controller 60 according to the fourth embodiment. The operation command generator 62 includes a function as an inference device that infers the operation command 67 from the operating information 65. The operation command generator 62 includes a data acquisition unit 77 and an inference unit 78.

The data acquisition unit 77 receives the operating information 65 for each of the plurality of the carriers 16 included in the transfer system 1. The data acquisition unit 77 acquires the operating information 65 as inference data. The operating information 65 acquired by the data acquisition unit 77 is input to the inference unit 78. The trained model 66 stored in the trained model storage unit 75 of the learning device 61 is input to the inference unit 78. The inference unit 78 infers the operation command 67 by inputting the operating information 65 to the trained model 66. The inference unit 78 outputs the operation command 67 as an inference result to the position command generator 63.

Figure 14:
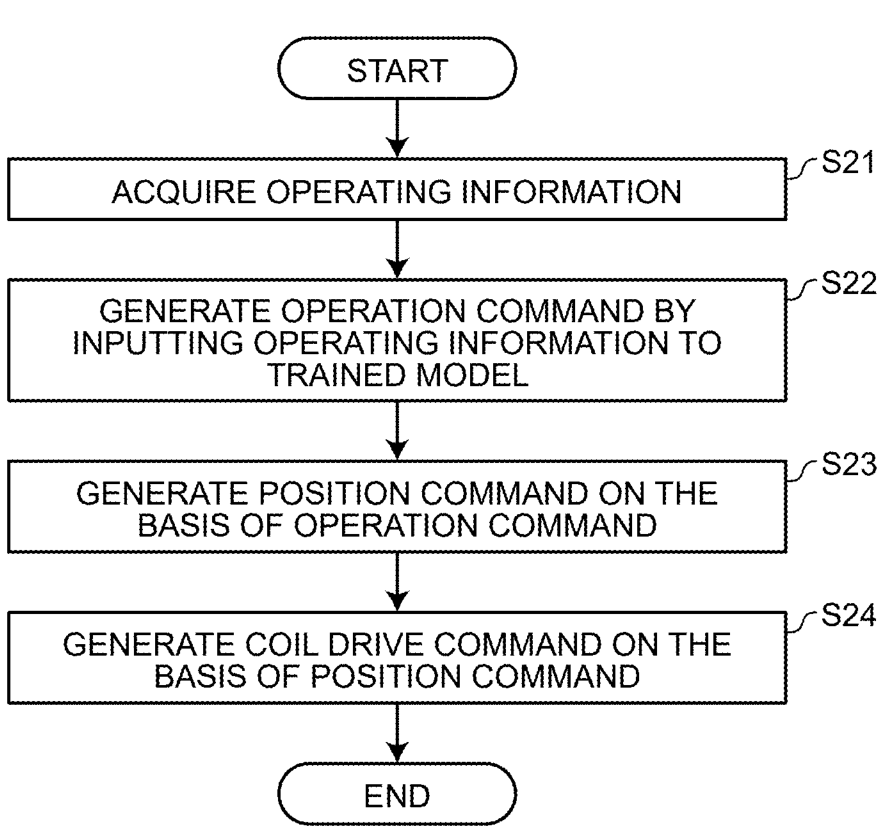
FIG. 14 is a flowchart illustrating a processing procedure of the operation command generator, a position command generator, and a coil drive command generator included in the controller according to the fourth embodiment.

FIG. 14 is a flowchart illustrating a processing procedure of the operation command generator 62, the position command generator 63, and the coil drive command generator 64 included in the controller 60 according to the fourth embodiment.

In step S21, the operation command generator 62 acquires the operating information 65 of each of the carriers 16 by the data acquisition unit 77. The data acquisition unit 77 outputs the operating information 65 acquired to the inference unit 78.

In step S22, the operation command generator 62 generates the operation command 67 by inputting the operating information 65 to the trained model 66 in the inference unit 78. The operation command generator 62 outputs the operation command 67 generated to the position command generator 63.

In step S23, the position command generator 63 generates the position command 68 on the basis of the operation command 67. The position command generator 63 outputs the position command 68 generated to the coil drive command generator 64.

In step S24, the coil drive command generator 64 generates the coil drive command 69 on the basis of the position command 68. The coil drive command generator 64 transmits the coil drive command 69 generated to each of the transfer path units 11 via the data communication lines 14. Then, the operation command generator 62, the position command generator 63, and the coil drive command generator 64 end the processing according to the procedure illustrated in FIG. 14.

According to the fourth embodiment, the transfer system 1 includes the learning device 61 and the operation command generator 62 as the inference device, thereby being able to derive the operation command 67 that decreases the maximum power value. As a result, the transfer system 1 can reduce the load of each of the transfer path units 11.

Next, hardware for implementing the controllers 12 and 60 according to the first to fourth embodiments will be described. The controllers 12 and 60 are each implemented by processing circuitry. The processing circuitry may be circuitry in which a processor executes software, or may be dedicated circuitry.

Figure 15:
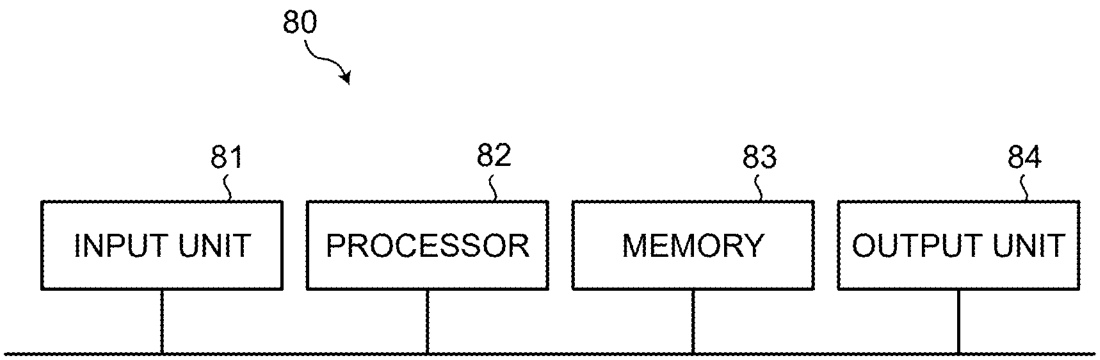
FIG. 15 is a diagram illustrating an exemplary configuration of a control circuit according to the first to fourth embodiments.

In the case where the processing circuitry is implemented by the software, the processing circuitry is, for example, a control circuit 80 illustrated in FIG. 15. FIG. 15 is a diagram illustrating an exemplary configuration of the control circuit 80 according to the first to fourth embodiments. The control circuit 80 includes an input unit 81, a processor 82, a memory 83, and an output unit 84. The input unit 81 is an interface circuit that receives data input from outside the control circuit 80 and gives the data to the processor 82. The output unit 84 is an interface circuit that sends data from the processor 82 or the memory 83 to the outside of the control circuit 80.

In the case where the processing circuitry is the control circuit 80 illustrated in FIG. 15, the controllers 12 and 60 are each implemented by software, firmware, or a combination of software and firmware. The software or firmware is described as programs and stored in the memory 83. The processing circuitry implements the functions of the controllers 12 and 60 by the processor 82 reading and executing the programs stored in the memory 83. That is, the processing circuitry includes the memory 83 for storing the programs, the execution of which results in the execution of the processing of the controllers 12 and 60. It can also be said that these programs cause a computer to execute the procedures and methods related to the controllers 12 and 60.

The processor 82 is a CPU. The processor 82 may be a central processor, a processing unit, an arithmetic unit, a microprocessor, a microcomputer, a processor, or a DSP. The memory 83 corresponds to, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disc, a digital versatile disc (DVD), or the like.

Figure 16:
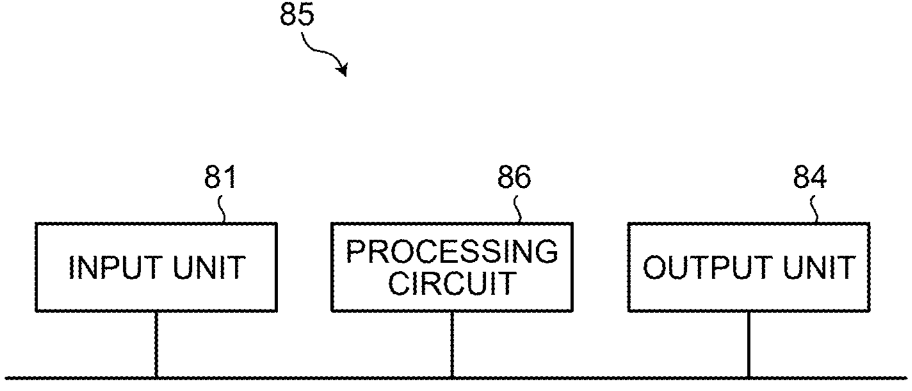
FIG. 16 is a diagram illustrating an exemplary configuration of a hardware circuit that is dedicated according to the first to fourth embodiments.

FIG. 15 is the example of the hardware in the case where the controllers 12 and 60 are implemented by the processor 82 and the memory 83 that are for general purpose use, but the controllers 12 and 60 may be implemented by a hardware circuit that is dedicated. FIG. 16 is a diagram illustrating an exemplary configuration of a hardware circuit 85 that is dedicated according to the first to fourth embodiments.

The hardware circuit 85 that is dedicated includes the input unit 81, the output unit 84, and a processing circuit 86. The processing circuit 86 is a single circuit, a complex circuit, a programmed processor, a parallel-programmed processor, an application specific integrated circuit (ASIC), a field programmable gate array (FPGA), or a circuit obtained by combining these. The functions of each of the controllers 12 and 60 may be implemented individually or collectively by the processing circuit 86. Note that the controllers 12 and 60 may each be implemented by a combination of the control circuit 80 and the hardware circuit 85.

In the case where the learning device 61 is the device external to the controller 60, the learning device 61 is implemented by processing circuitry as with the controllers 12 and 60. The processing circuitry that implements the learning device 61 is the control circuit 80 illustrated in FIG. 15 or the hardware circuit 85 that is dedicated illustrated in FIG. 16.

Specific modes of distribution or integration of the components in the transfer system 1 according to the first to fourth embodiments are not limited to those described in the first to fourth embodiments. All or some of the components in the transfer system 1 may be functionally or physically distributed or integrated in units of any size.

The configurations illustrated in the embodiments above each illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

REFERENCE SIGNS LIST

1 transfer system; 10 transfer path; 11, 11A, 11B, 11C, 11D, 11E, 11F, 11G, 11H transfer path unit; 12, 60 controller; 13 DC power supply; 14 data communication line; 15 DC power supply bus; 16, 16A, 16B, 16C, 16D carrier; 17A, 17B, 42 arrow; 20 coil; 21 inverter; 22 current sensor; 23 capacitor; 24 current controller; 25 linear scale; 26 position sensor; 27, 82 processor; 28 communication slave station; 31 P bus; 32 N bus; 33 voltage detector; 34 temperature sensor; 40, 41 permanent magnet; 51, 52, 56 curve; 53, 54, 55, 57, 58, 59 point; 61 learning device; 62 operation command generator; 63 position command generator; 64 coil drive command generator; 65 operating information; 66 trained model; 67 operation command; 68 position command; 69 coil drive command; 71, 77 data acquisition unit; 72 model generation unit; 73 reward calculation unit; 74 function update unit; 75 trained model storage unit; 76 training data; 78 inference unit; 80 control circuit; 81 input unit; 83 memory; 84 output unit; 85 hardware circuit; 86 processing circuitry.

The invention claimed is:

1. A transfer system comprising a plurality of conveyors that forms a transfer path on which one or a plurality of transferring bodies move, wherein the plurality of the conveyors each includes:

a plurality of drivers to be energized to generate thrust that moves the transferring body; and a processor to determine whether or not each of the plurality of the drivers is in an overload state and also determine whether or not the conveyor is in an overload state, and in each of the plurality of the conveyor, the processor executes overload protection processing that lowers temperature of the drivers determined to be in the overload state or temperature of the conveyor determined to be in the overload state.

2. The transfer system according to claim 1, wherein in a case where at least one of the plurality of the drivers is determined to be in the overload state in one of the plurality of the conveyors, or in a case where one of the plurality of the conveyors is determined to be in the overload state, the plurality of the conveyors executes the overload protection processing to stop or decelerate all the transferring bodies on the transfer path.

3. The transfer system according to claim 1, wherein in a case where at least one of the plurality of the drivers is determined to be in the overload state in one of the plurality of the units conveyors, the conveyor including the driver determined to be in the overload state executes the overload protection processing to stop or decelerate the transferring body.

4. The transfer system according to claim 1, wherein in a case where one of the plurality of the conveyors is determined to be in the overload state, the conveyor determined to be in the overload state executes the overload protection processing to stop or decelerate the transferring body.

5. The transfer system according to claim 1, wherein in a case where at least one of the plurality of the drivers is determined to be in the overload state in one of the plurality of the conveyors, the processor of the conveyor including the driver determined to be in the overload state stops energization of the driver determined to be in the overload state.

6. The transfer system according to claim 1, wherein the driver includes a component to be monitored as to whether or not the component is in the overload state, and the processor determines whether or not the component is in the overload state by comparing a first criterion set in advance with a root mean square of a current flowing through the component and a time for which the current flows through the component, the first criterion being a relationship between a first load determination value, which is a threshold of the current flowing through the component when the component is not in the overload state and when the component is in the overload state, and the time for which the current flows through the component.

7. The transfer system according to claim 6, wherein the driver includes a first component and a second component each as the component to be monitored, the first component is an inverter, and the second component is a coil to generate an electromagnetic force that is the thrust by power supplied from the inverter.

8. The transfer system according to claim 1, wherein the processor determines whether or not the conveyor is in the overload state by comparing a second criterion set in advance with a loss of the conveyor and a time for which a load is applied to the conveyor the second criterion being a relationship between a second load determination value, which is a threshold of the loss of the conveyor when the conveyor is not in the overload state and when the conveyor is in the overload state, and the time for which the load is applied to the conveyor.

9. The transfer system according to claim 8, wherein, for the plurality of the conveyors, the second load determination value different for each of the conveyors can be set.

10. The transfer system according to claim 8, wherein, in the second criterion, the second load determination value converges to a constant value as time passes, and a maximum rated loss, which is the loss of the conveyor when the second load determination value is the constant value, is smaller than the loss of the conveyor when a value of the current flowing through each of the plurality of the drivers is a maximum rated current value of the driver.

11. The transfer system according to claim 1, wherein the processor determines whether or not the conveyor is in the overload state on the basis of a root mean square of the current flowing through the plurality of the drivers.

12. The transfer system according to claim 1, wherein the processor determines whether or not the conveyor is in the overload state on the basis of a detected result of the temperature of the conveyor.

13. The transfer system according to claim 8, wherein the processor of each of the plurality of the conveyors determines whether or not the conveyor is in a high load state that is a state in which the conveyor is expected to reach the overload state, and in a case where one of the plurality of the conveyors is determined to be in the high load state, the processor of a second conveyor, which is the conveyor adjacent to a first conveyor that is the conveyor determined to be in the high load state, determines whether or not the second conveyor is in the overload state on the basis of the second criterion on which a correction is made to set the second load determination value smaller than a preset value.

14. The transfer system according to claim 13, comprising a controller to control movement of the transferring body, wherein the first conveyor determined to be in the high load state notifies the controller that the first conveyor is in the high load state, and the processor of the second conveyor makes the correction on the second criterion when receiving a notification from the controller that the first conveyor is in the high load state.

15. The transfer system according to claim 8, comprising a controller to control movement of the transferring body, wherein the controller determines whether or not each of the plurality of the conveyors is in a high load state that is a state in which the conveyor is expected to reach the overload state, and in a case where one of the plurality of the conveyors is determined to be in the high load state, the processor of a second conveyor, which is the conveyor adjacent to a first conveyor that is the conveyor determined to be in the high load state, determines whether or not the second conveyor is in the overload state on the basis of the second criterion on which a correction is made to set the second load determination value smaller than a preset value.

16. The transfer system according to claim 15, wherein the controller makes the correction on the second criterion for the second conveyor, and notifies the second conveyor of the second criterion on which the correction has been made.

17. The transfer system according to claim 1, comprising a learning device including:

a data acquisition circuitry to acquire training data including operating information and an operation command, the operating information being information indicating a schedule of movement of each of the plurality of the transferring bodies on the transfer path, the operation command indicating a mode of movement for each of the plurality of the transferring bodies; and a model generation circuitry to generate, on the basis of the training data, a trained model to be used for inference of the operation command from the operating information.

18. The transfer system according to claim 1, comprising an operation command generator to generate an operation command indicating a mode of movement for each of the plurality of the transferring bodies, wherein the operation command generator includes:

a data acquisition circuitry to acquire operating information that is information indicating a schedule of movement of each of the plurality of the transferring bodies on the transfer path; and an inference circuitry to infer the operation command by inputting the operating information to a trained model that is used for inference of the operation command from the operating information.

* * * * *